United States Patent
Sivapuram et al.

(10) Patent No.: US 9,603,039 B2
(45) Date of Patent: Mar. 21, 2017

(54) OPPORTUNISTIC MEDIA PATCHING FOR A COMMUNICATION SESSION

(71) Applicant: QUALCOMM Incorporated, San Diego, CA (US)

(72) Inventors: Saritha Sivapuram, San Diego, CA (US); Mark Aaron Lindner, Verona, WI (US); Kirankumar Anchan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 14/230,570

(22) Filed: Mar. 31, 2014

(65) Prior Publication Data

US 2014/0301180 A1 Oct. 9, 2014

Related U.S. Application Data

(60) Provisional application No. 61/807,955, filed on Apr. 3, 2013.

(51) Int. Cl.
*H04L 1/00* (2006.01)
*H04W 24/04* (2009.01)
(Continued)

(52) U.S. Cl.
CPC ........... *H04W 24/04* (2013.01); *H04L 65/604* (2013.01); *H04L 65/80* (2013.01);
(Continued)

(58) Field of Classification Search
CPC ....... H04W 24/04; H04L 69/40; H04L 65/604
See application file for complete search history.

(56) References Cited

U.S. PATENT DOCUMENTS

| 6,289,054 B1* | 9/2001 | Rhee ..................... 375/240.27 |
| 2002/0004838 A1* | 1/2002 | Hakenberg .................... 709/231 |

(Continued)

FOREIGN PATENT DOCUMENTS

| EP | 1361690 A2 | 11/2003 |
| WO | 2009120301 A2 | 10/2009 |
| WO | 2011156958 A1 | 12/2011 |

OTHER PUBLICATIONS

Begen A.C., et al., "An Adaptive Media-Aware Retransmission Timeout Estimation Method for Low-Delay Packet Video," IEEE Transactions on Multimedia, Feb. 2007, vol. 9 (2), pp. 332-347.
(Continued)

*Primary Examiner* — Jutai Kao
(74) *Attorney, Agent, or Firm* — Shirin Tefagh

(57) ABSTRACT

A user equipment (UE) selectively attempts recovery of lost media for a real-time communication session. In an embodiment, the UE detects presence of a lost media packet from another UE participating in the real-time communication session that did not successfully arrive at the UE. The UE evaluates a set of recovery criteria associated with the lost media packet to attempt to dynamically select at least one external source from a plurality of external sources from which the lost media packet can potentially be recovered at different predicted reliabilities and/or response times for attempting recovery of the lost media packet based on the set of recovery criteria. The UE attempts to recover the lost media packet from the selected at least one external source based on the evaluation.

30 Claims, 18 Drawing Sheets

(51) Int. Cl.
  *H04L 29/14*  (2006.01)
  *H04L 29/08*  (2006.01)
  *H04N 21/6375*  (2011.01)
  *H04N 21/63*  (2011.01)
  *H04L 29/06*  (2006.01)

(52) U.S. Cl.
  CPC .......... H04L 67/1002 (2013.01); H04L 69/40 (2013.01); *H04L 65/1083* (2013.01); *H04L 67/1076* (2013.01); *H04L 67/1078* (2013.01); *H04L 67/1095* (2013.01); *H04N 21/632* (2013.01); *H04N 21/6375* (2013.01)

(56) References Cited

U.S. PATENT DOCUMENTS

| | | | |
|---|---|---|---|
| 2008/0225735 A1 | 9/2008 | Qiu et al. | |
| 2008/0259964 A1* | 10/2008 | Tomita | H04L 1/1838 370/501 |
| 2008/0309825 A1* | 12/2008 | Utagawa | H04N 21/44209 348/725 |
| 2009/0178096 A1* | 7/2009 | Menn | H04L 1/0009 725/114 |
| 2009/0245252 A1* | 10/2009 | Konishi | H04L 1/1809 370/390 |
| 2010/0031109 A1* | 2/2010 | Muramoto | H04L 1/1877 714/748 |
| 2011/0131278 A1* | 6/2011 | Nieh | H04L 67/104 709/204 |
| 2011/0238789 A1 | 9/2011 | Luby et al. | |
| 2012/0110609 A1* | 5/2012 | Guo | H04N 21/23432 725/14 |
| 2012/0221678 A1* | 8/2012 | Tanaka | H04L 1/1835 709/217 |
| 2013/0089020 A1* | 4/2013 | Hakola | 370/312 |

OTHER PUBLICATIONS

Setton E., et al., "Rate-distortion optimized video peer-to-peer multicast streaming," in Proceedings of ACM APPMS, 2005, 10 pages.

Wang M., et al., "R2: Random Push with Random Network Coding in Live Peer-to-Peer Streaming," IEEE Journal on Selected Areas in Communications, Dec. 2007, vol. 25 (9), pp. 1-12.

International Search Report and Written Opinion—PCT/US2014/032558—ISA/EPO—Aug. 5, 2014.

Sinkar K. et al., "Cooperative Recovery in Heterogeneous Mobile Networks",Sensor, Mesh and Ad Hoc Communications and Networks, 2008. SECON '08. 5th Annual IEEE Communications Society Conference on, IEEE, Piscataway, NJ, USA, Jun. 16, 2008 (Jun. 16, 2008), pp. 395-403,XP031282615.

* cited by examiner

OPPORTUNISTIC MEDIA PATCHING FOR A COMMUNICATION SESSION

CLAIM OF PRIORITY UNDER 35 U.S.C. §119

The present application for patent claims priority to Provisional Application No. 61/807,955, entitled "OPPORTUNISTIC MEDIA PATCHING FOR A COMMUNICATION SESSION", filed Apr. 3, 2013, by the same inventors as the subject application, assigned to the assignee hereof and hereby expressly incorporated by reference herein in its entirety.

BACKGROUND OF THE INVENTION

1. Field of the Invention

Embodiments of the invention relate to opportunistic media patching for a communication session.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

In any of the aforementioned communication protocols, user equipments (UEs) can engage in communication sessions with other UEs whereby media (e.g., audio media, video media, etc.) is exchanged and played in 'real-time'. In real-time communication sessions, the value of media drops precipitously as time (e.g., mere seconds of tenths of a second) goes by. For example, audio data (e.g., one or more audio frames) contained in an audio packet received during a phone call typically need to be played relatively soon (e.g., 100-200 ms) after receipt by a target UE, or else the audio data will not have relevance to the phone call. Also, if the audio packet is lost during the phone call, it can take a relatively long time (e.g., several seconds) to re-obtain the lost audio packet (e.g., from the speaker or a server that archives audio packets for the phone call). To mitigate packet loss during real-time communication sessions, mechanisms such as forward error correction (FER) or interleaving are used. However, in the event that media packets (such as the audio packet in the preceding example) are lost during a real-time communication session, the target UE typically allows the real-time communication session to continue without attempting to recover media that was contained in the lost media packets due to the expectation that this media will not be relevant upon its eventual arrival if recovery were attempted.

SUMMARY

A user equipment (UE) selectively attempts recovery of lost media for a real-time communication session. In an embodiment, the UE detects presence of a lost media packet from another UE participating in the real-time communication session that did not successfully arrive at the UE. The UE evaluates a set of recovery criteria associated with the lost media packet to attempt to dynamically select at least one external source from a plurality of external sources from which the lost media packet can potentially be recovered at different predicted reliabilities and/or response times for attempting recovery of the lost media packet based on the set of recovery criteria. The UE attempts to recover the lost media packet from the selected at least one external source based on the evaluation.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
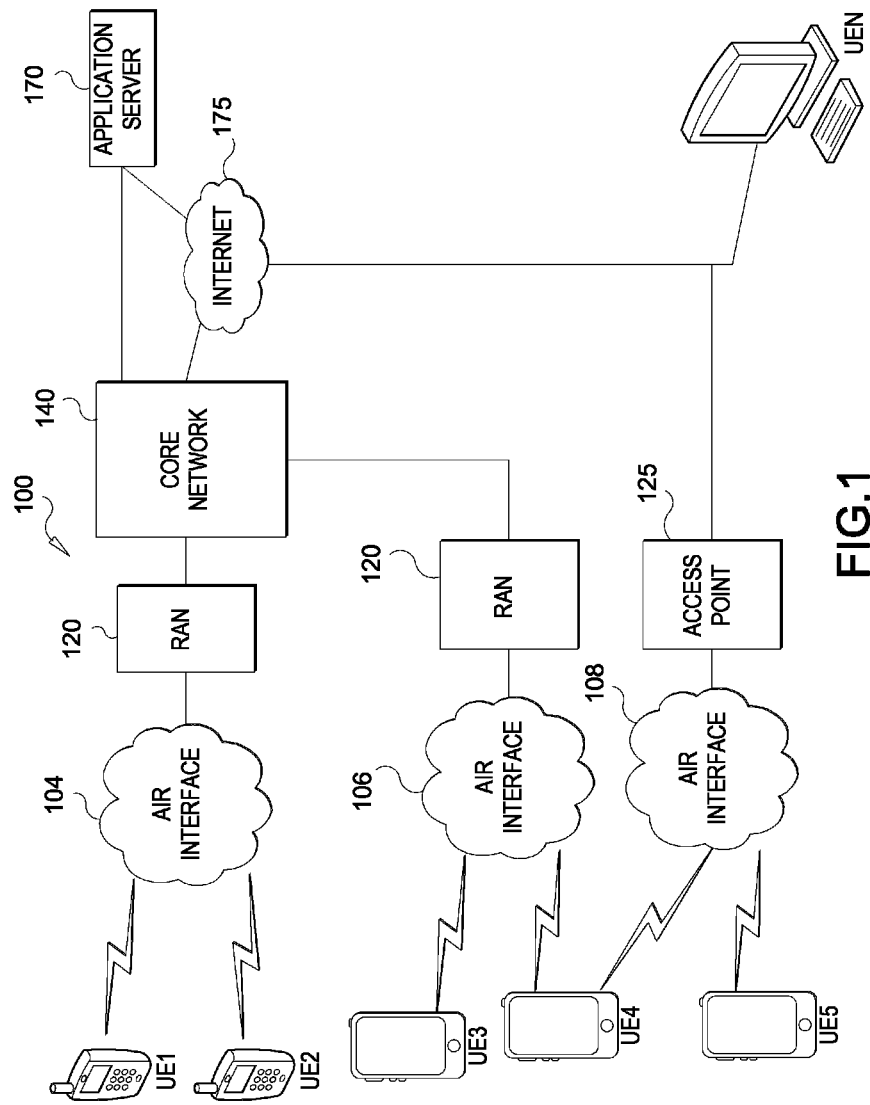
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
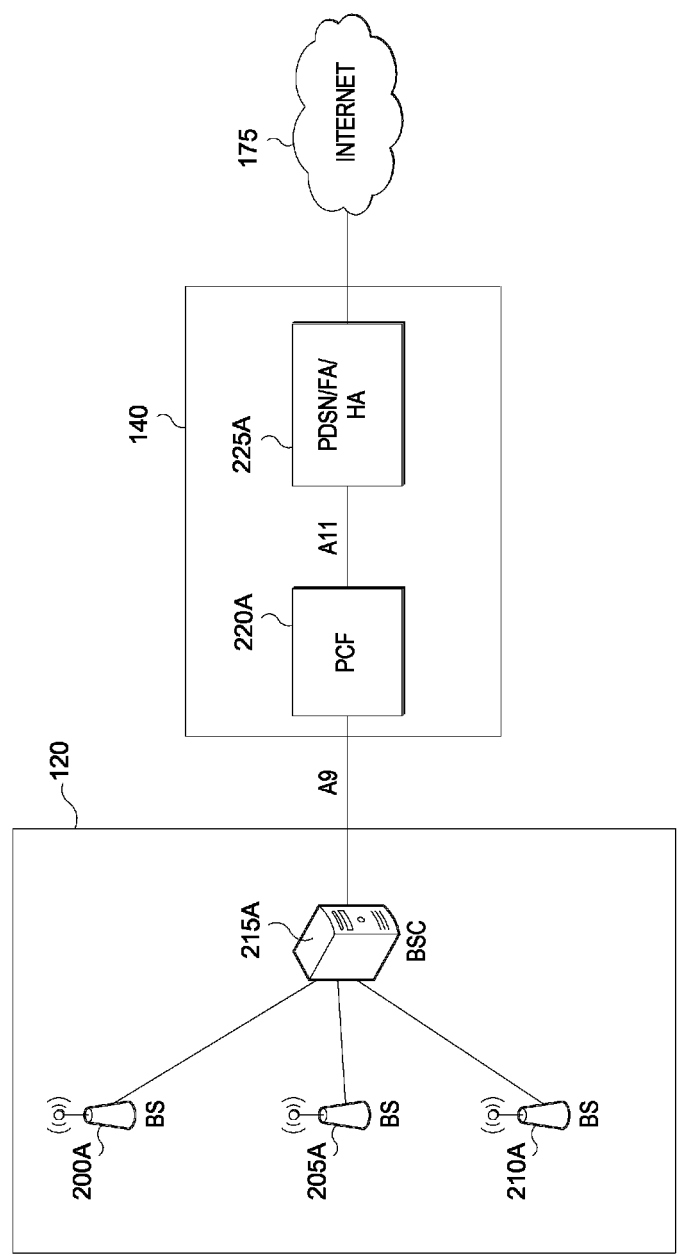
FIG. 2A illustrates an example configuration of a radio access network (RAN) and a packet-switched portion of a core network for a 1×EV-DO network in accordance with an embodiment of the invention.

FIG. 2A illustrates an example configuration of the RAN 120 and the core network 140 for packet-switched communications in a CDMA2000 1× Evolution-Data Optimized (EV-DO) network in accordance with an embodiment of the invention. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
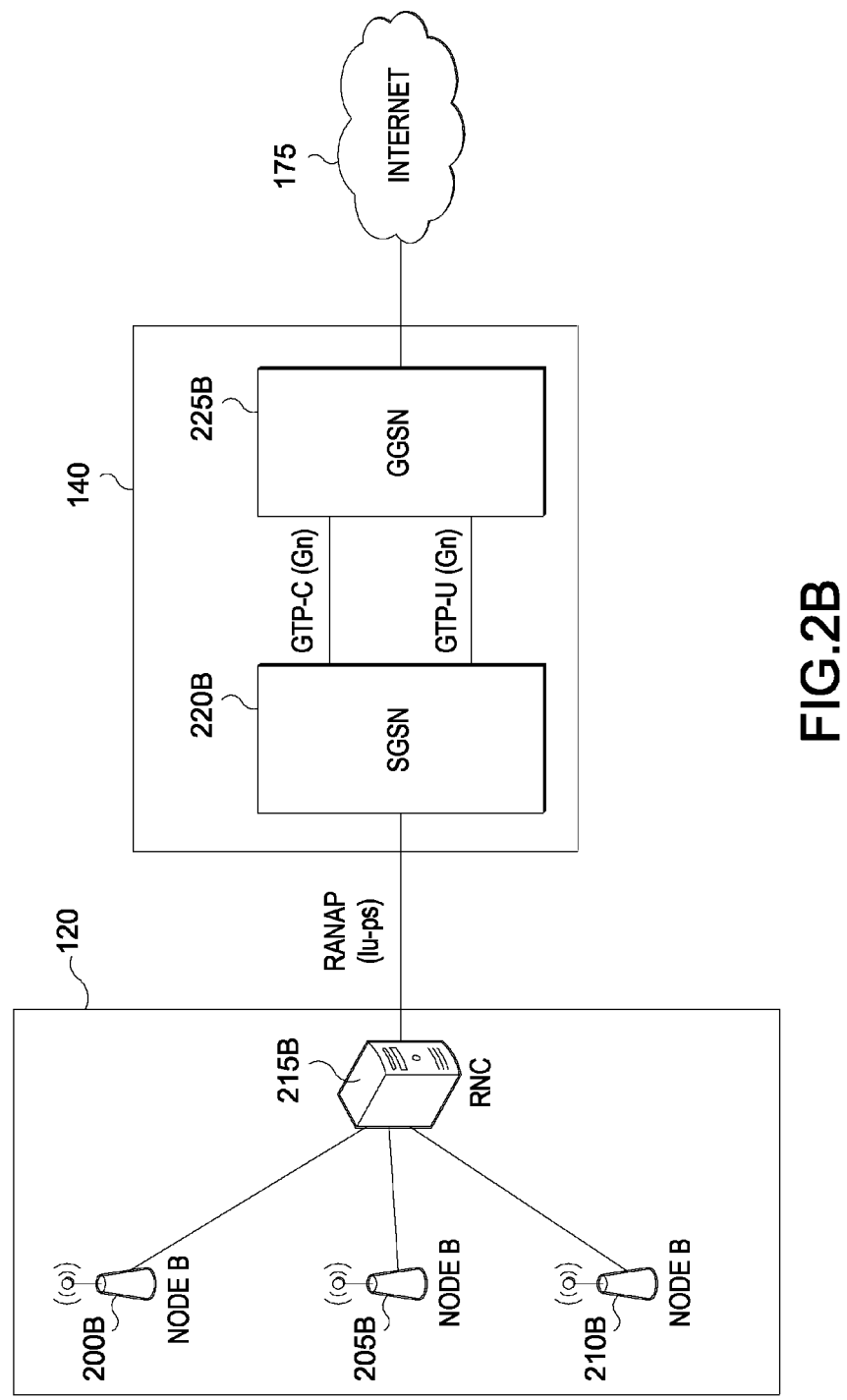
FIG. 2B illustrates an example configuration of the RAN and a packet-switched portion of a General Packet Radio Service (GPRS) core network within a 3G UMTS W-CDMA system in accordance with an embodiment of the invention.

FIG. 2B illustrates an example configuration of the RAN 120 and a packet-switched portion of the core network 140 that is configured as a GPRS core network within a 3G UMTS W-CDMA system in accordance with an embodiment of the invention. Referring to FIG. 2B, the RAN 120 includes a plurality of Node Bs 200B, 205B and 210B that are coupled to a Radio Network Controller (RNC) 215B over a wired backhaul interface. Similar to 1×EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
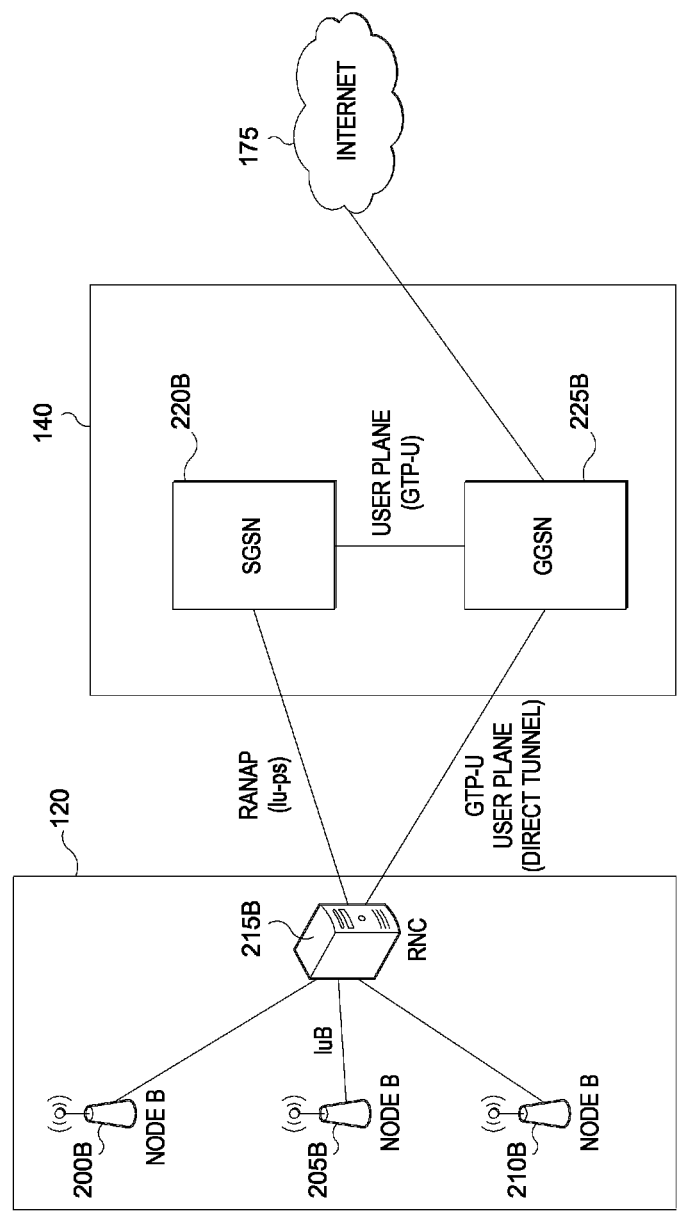
FIG. 2C illustrates another example configuration of the RAN and a packet-switched portion of a GPRS core network within a 3G UMTS W-CDMA system in accordance with an embodiment of the invention.

FIG. 2C illustrates another example configuration of the RAN 120 and a packet-switched portion of the core network 140 that is configured as a GPRS core network within a 3G UMTS W-CDMA system in accordance with an embodiment of the invention. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
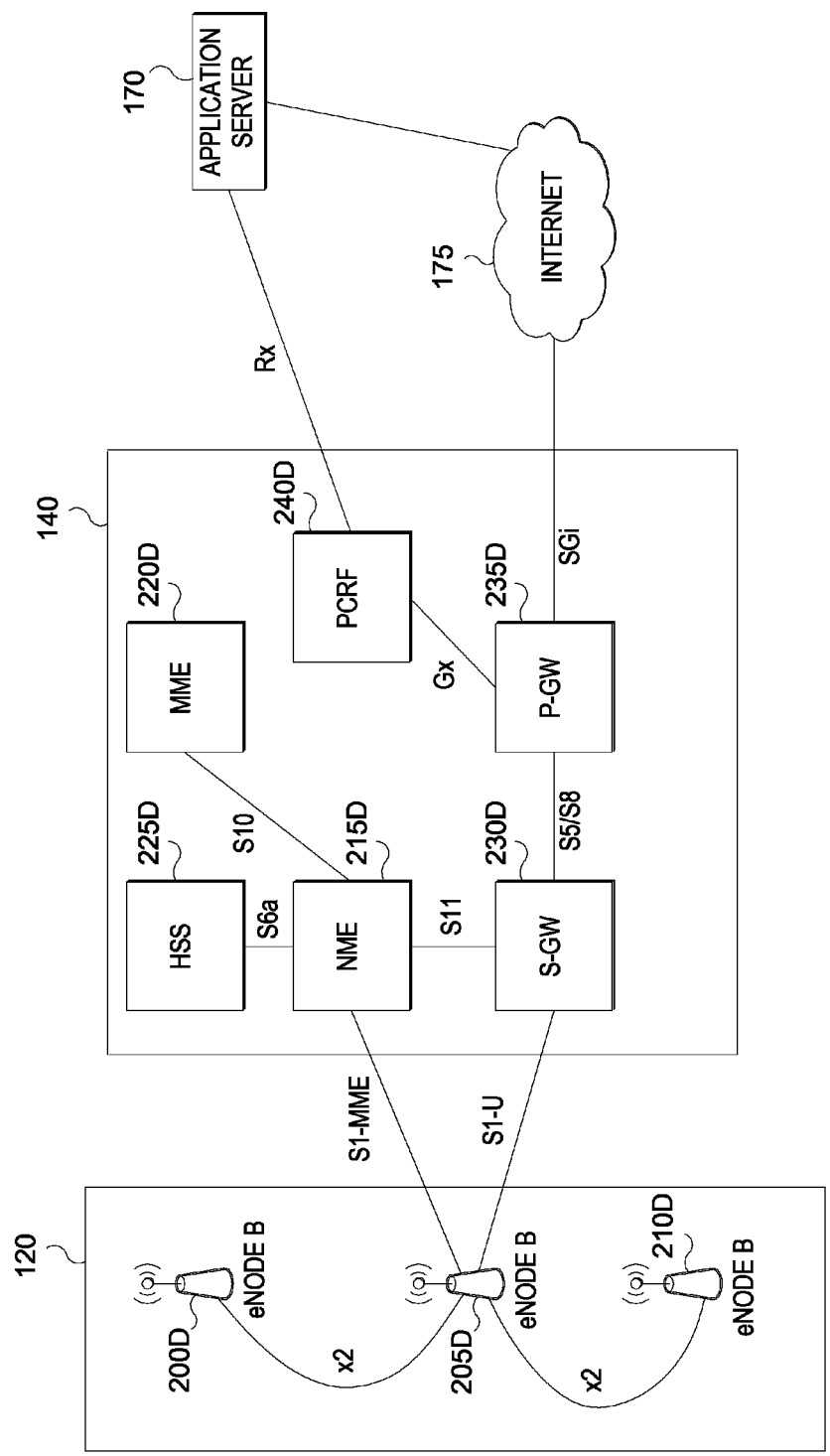
FIG. 2D illustrates an example configuration of the RAN and a packet-switched portion of the core network that is based on an Evolved Packet System (EPS) or Long Term Evolution (LTE) network in accordance with an embodiment of the invention.

FIG. 2D illustrates an example configuration of the RAN 120 and a packet-switched portion of the core network 140 based on an Evolved Packet System (EPS) or LTE network, in accordance with an embodiment of the invention. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
| --- | --- |
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffSery Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
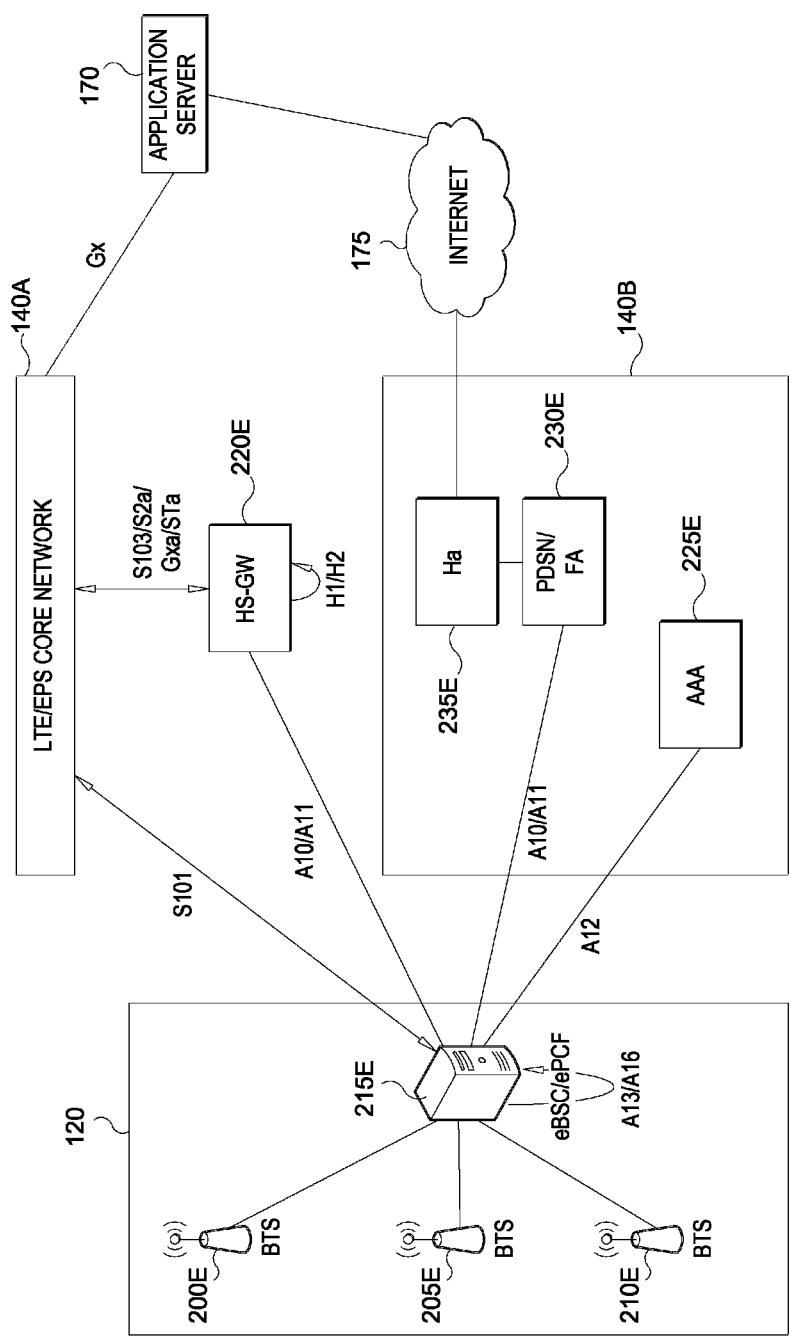
FIG. 2E illustrates an example configuration of an enhanced High Rate Packet Data (HRPD) RAN connected to an EPS or LTE network and also a packet-switched portion of an HRPD core network in accordance with an embodiment of the invention.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an embodiment of the invention. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 220D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
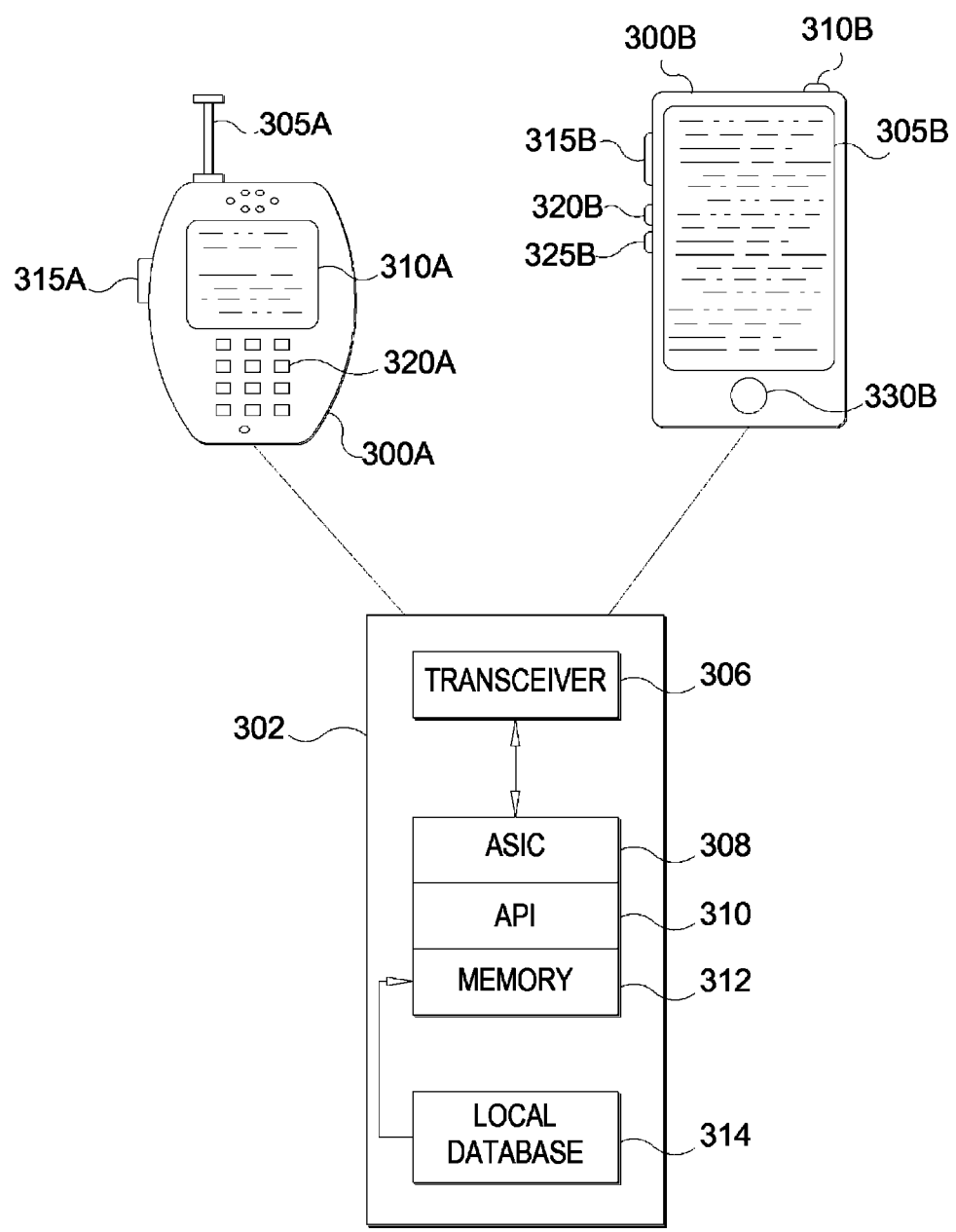
FIG. 3 illustrates examples of user equipments (UEs) in accordance with embodiments of the invention.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
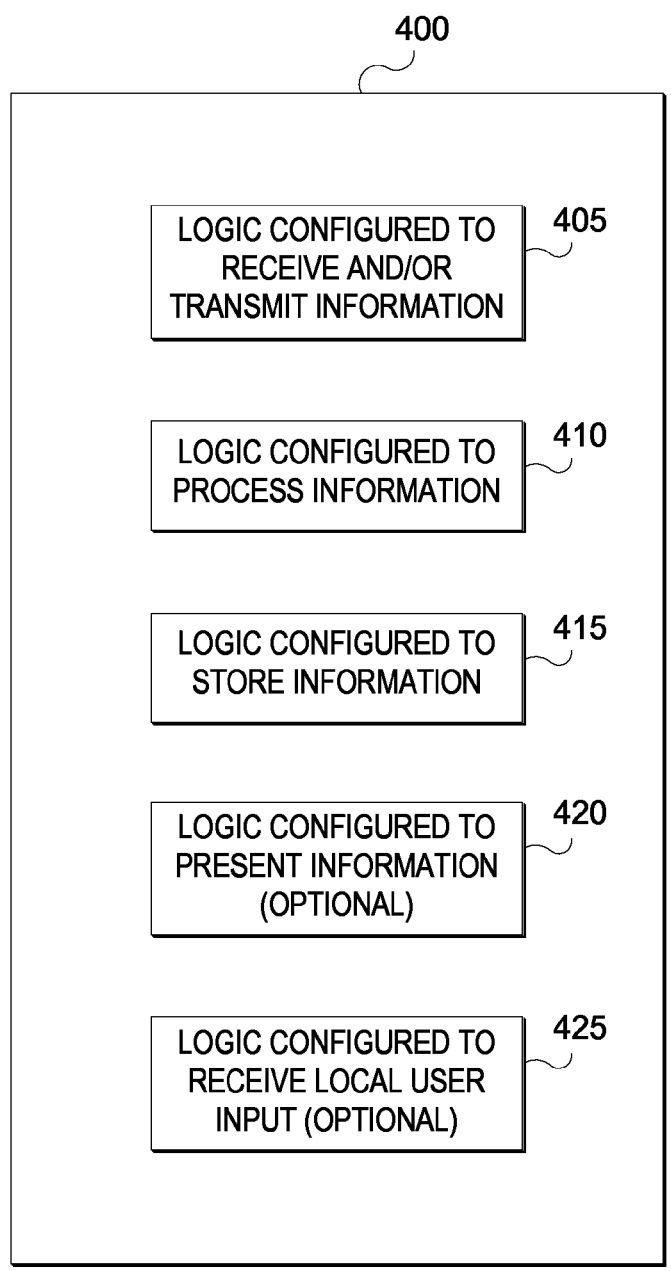
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
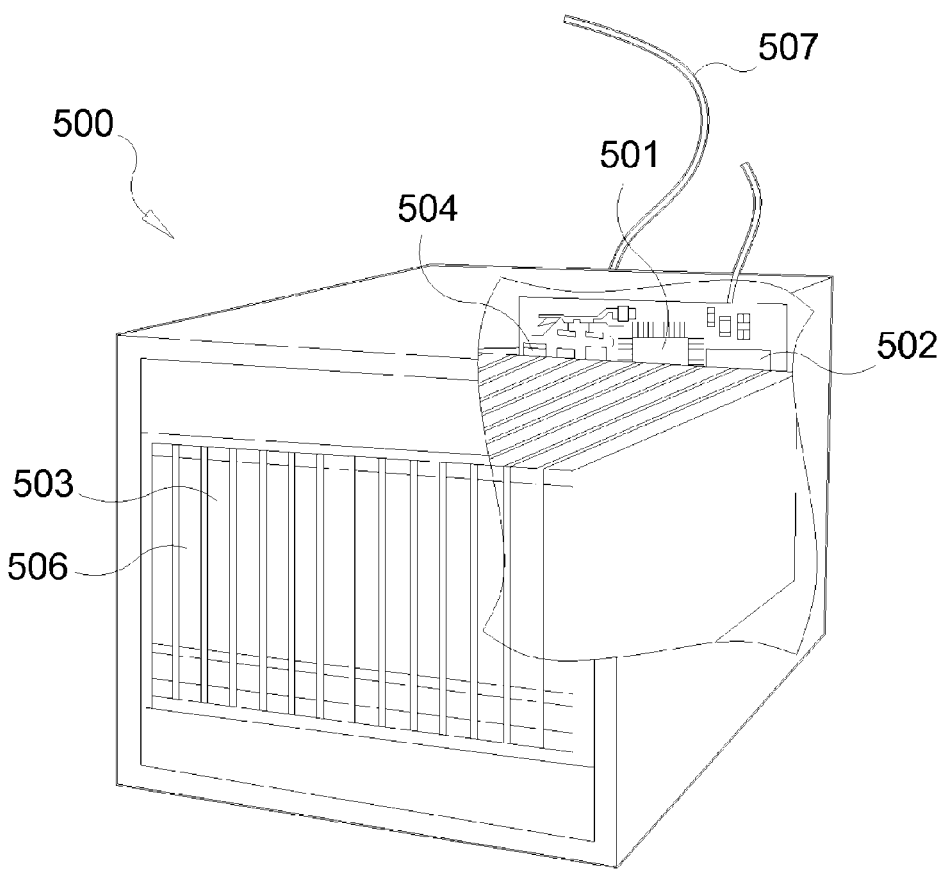
FIG. 5 illustrates a server in accordance with an embodiment of the invention.

The various embodiments may be implemented on any of a variety of commercially available server devices, such as server 500 illustrated in FIG. 5. In an example, the server 500 may correspond to one example configuration of the application server 170 described above. In FIG. 5, the server 500 includes a processor 500 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access ports 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to a UE implementation as in 305A or 305B as in FIG. 3.

In any of the aforementioned communication protocols (e.g., EV-DO, W-CDMA, LTE, eHRPD, etc.), user equipments (UEs) can engage in communication sessions with other UEs whereby media (e.g., audio media, video media, etc.) is exchanged and played in 'real-time'. In real-time communication sessions, the value of media drops precipitously as time (e.g., mere seconds of tenths of a second) goes by. For example, audio data (e.g., one or more audio frames) contained in an audio packet received during a phone call typically need to be played relatively soon (e.g., 100-200 ms) after receipt by a target UE, or else the audio data will not have relevance to the phone call. Also, if the audio packet is lost during the phone call, it can take a relatively long time (e.g., several seconds) to re-obtain the lost audio packet (e.g., from the speaker or a server that archives audio packets for the phone call). To mitigate packet loss during real-time communication sessions, mechanisms such as forward error correction (FER) or interleaving are used. However, in the event that media packets (such as the audio packet in the preceding example) are lost during a real-time communication session, the target UE typically allows the real-time communication session to continue without attempting to recover media that was contained in the lost media packets due to the expectation that this media will not be relevant upon its eventual arrival if recovery were attempted.

Figure 6:
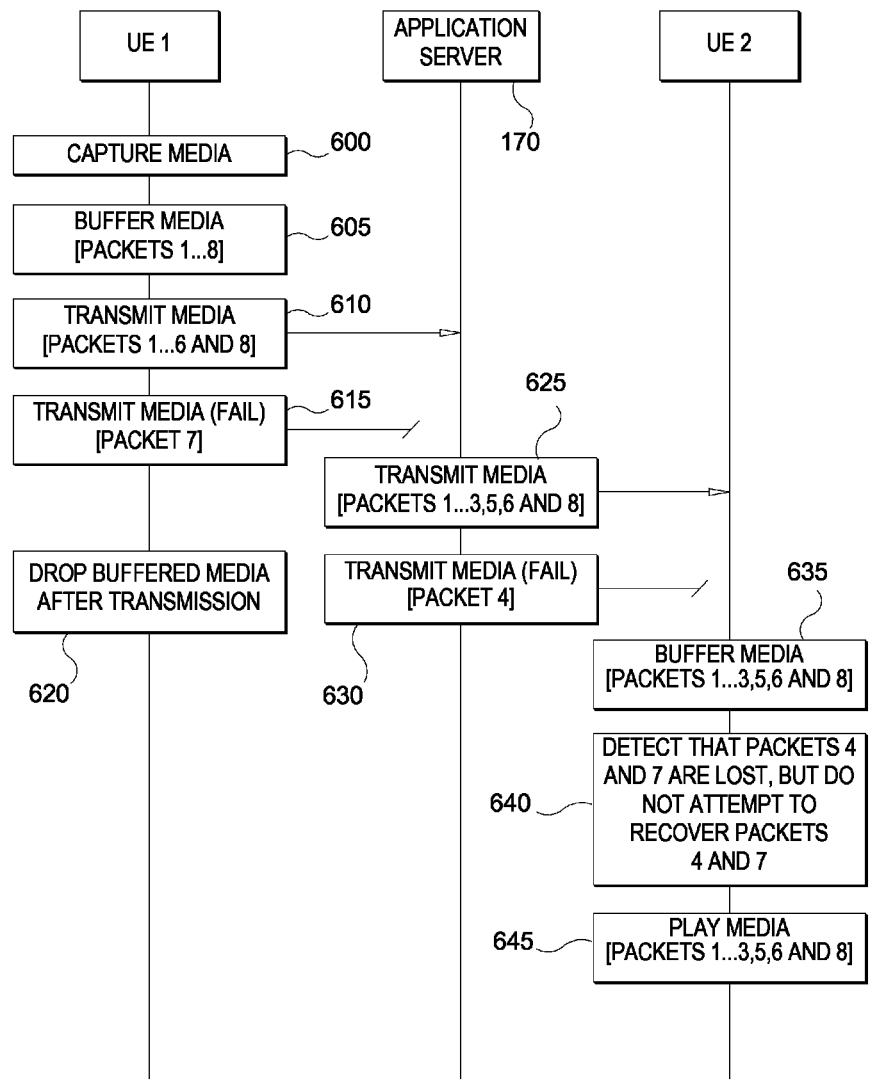
FIG. 6 illustrates a conventional real-time communication session that is arbitrated by an application server whereby a transmitting UE is delivering media to a target UE.

FIG. 6 illustrates a conventional real-time communication session that is arbitrated by the application server 170 whereby UE 1 is delivering media (e.g., audio media, video media, etc.) to UE 2. The real-time communication session in FIG. 6 can be half-duplex or full-duplex even though FIG. 6 focuses upon the flow of uni-directional media packets from UE 1 to UE 2. In an example, the real-time communication session in FIG. 6 can correspond to a real-time transport protocol (RTP) over user datagram protocol (UDP) session, whereby media (e.g., audio media, video media, etc.) is contained within RTP packets that each include at least one media frame.

Referring to FIG. 6, during the real-time communication session, UE 1 captures media, 600. The media capture that occurs at 600 can correspond to an audio recording device (e.g., a microphone) capturing audio data such as speech of an operator of UE 1, and/or to a video recording device (e.g., a camera) capturing video data of an environment of UE 1. UE 1 buffers the captured media within a set of media packets, 605. For convenience of explanation, assume that the captured media is buffered within media packets 1 . . . 8. In FIG. 6, assume that UE 1 successfully transmits media packets 1 . . . 6 and 8 to the application server 170, 610, but UE 1 does not successfully transmit media packet 7 to the application server 170, 615. For example, the transmission failure of 615 can be caused by physical later interference between UE 1 and its serving RAN, a backhaul loss between UE 1's serving RAN and the application server 170, and so on. After attempting to transmit media packets 1 . . . 8 at 610 and 615, UE 1 clears its buffer and does not retain media packets 1 . . . 8, 620. In FIG. 6, even though media packet 7 was not transmitted successfully at 615, UE 1 does not attempt to re-transmit media packet 7. For example, unlike transmission control protocol (TCP) data transfers, RTP over UDP sessions generally do not require data transmission when failure (or packet loss) is detected due to the time-sensitive nature of each RTP packet.

Referring to FIG. 6, assume that the application server 170 successfully transmits media packets 1, 2, 3, 5, 6 and 8 to UE 2, 625, but that the application server 170 is unable to successfully transmit media packet 4, 630. For example, the transmission failure of 630 can be caused by physical later interference between UE 2 and its serving RAN, a backhaul loss between UE 2's serving RAN and the application server 170, and so on. Also, as will be recognized from 615, media packet 7 is not transmitted at 625 or 630 because media packet 7 never arrived at the application server 170.

UE 2 receives and buffers media packets 1, 2, 3, 5, 6 and 8, 635. UE 2 also recognizes that media packets 4 and 7 were lost at some point during transfer, 640, but UE 2 does not attempt to recover lost media packets 4 and 7 because UE 2 assumes that these packets will be obsolete upon arrival if recovery were attempted. Again, this assumption is built into the operation of the real-time communication session in FIG. 6. UE 2 plays the media frames contained within media packets 1, 2, 3, 5, 6 and 8 (i.e., the media packets that were actually received by UE 2), 645, and media packets 4 and 7 (i.e., the media packets that did not successfully arrive at UE 2) are not played.

While FIG. 6 relates to the scenario where no re-transmission of lost media packets is attempted at all for a real-time communication session, there are conventional protocols such as the radio link protocol (RLP) that permit media packet retransmission for real-time communication sessions. In RLP sessions, when a target UE misses a media packet, the target UE immediately requests its serving RAN to re-transmit the missed (or lost) media packet. However, if the target UE's serving RAN does not have access to the lost media packet (e.g., such as media packet 7 from FIG. 6), the lost media packet cannot be re-transmitted. Also, it is possible that even if the target UE's serving RAN has access to the lost media packet (e.g., such as media packet 4), the re-transmission of the lost media packet may simply occur too late to be played during the RLP session. For these reasons, embodiments of the invention are directed to selectively recovering lost media packets during a real-time communication session based on a set of recovery criteria.

Figure 7:
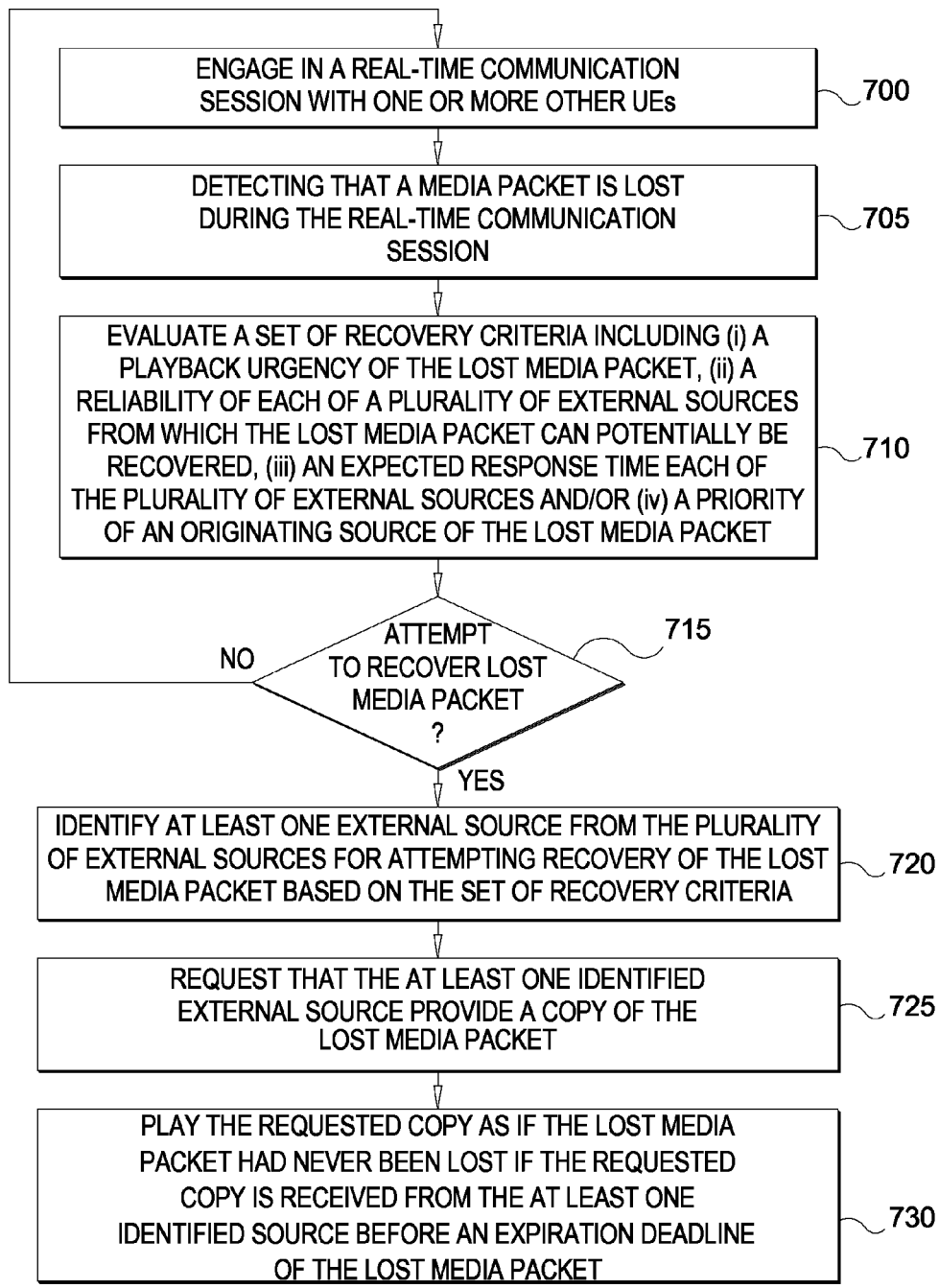
FIG. 7 illustrates a lost media packet recovery procedure that is implemented by a UE engaged in a real-time communication session with one or more other UEs in accordance with an embodiment of the invention.

FIG. 7 illustrates a lost media packet recovery procedure that is implemented by a UE engaged in a real-time communication session with one or more other UEs in accordance with an embodiment of the invention. In the embodiment of FIG. 7, the UE can either be actively participating in the real-time communication session, or can temporarily be in a pause-state or hold-state with the expectation that the UE will return to active participation in the real-time communication session relatively soon (e.g., the UE switches to another call without canceling the real-time communication session, an operator of the UE selects a pause option, etc.).

Referring to FIG. 7, assume that the UE is engaged in a real-time communication session with one or more other UEs, 700. The real-time communication session can correspond to a half-duplex or full-duplex communication session. The real-time communication session can also correspond to either a 1:1 or direct communication session where the session is between the UE and one other UE, or a group communication session between the UE and two or more other UEs.

During the real-time communication session, the UE detects that a media packet is lost, 705. The lost media packet can occur due to an error during transfer from the one or more other UEs to the application server 170 (e.g., a poor physical layer connection to a serving RAN or backhaul connection), or an error during transfer from the application server 170 to the UE itself (e.g., a poor physical layer connection to a serving RAN or backhaul connection).

In response to the detection of the lost media packet at 705, the UE evaluates a set of recovery criteria, 710, in order to determine whether to attempt to recover the lost media packet, 715. While not shown explicitly in FIG. 7, it is possible that there are no available external sources for the lost media packet (e.g., none of the entities that accessed the lost media packet are expected to have a buffered version of the lost media packet, etc.), in which case the determination of 715 would automatically determine not to attempt recovery for the lost media packet irrespective of the set of recovery criteria. Unlike FIG. 6 where no media packet recovery is attempted for lost media packets at all and the alternative RLC session scenario where media packet recovery is always attempted from the serving RAN, the evaluation of 710 permits the decision of whether to attempt lost media packet recovery to occur in a selective manner. In an example, the set of recovery criteria can include, but is not limited to, (i) a playback urgency of the lost media packet, (ii) a reliability of each of a set of external sources from which the lost media packet can potentially be recovered, (iii) an expected response time each of the set of external sources, and/or (iv) a priority of the lost media packet (e.g., which can be based upon a priority of the UE from which the lost media packet originated). As used herein, an "external" source corresponds to any entity that is potentially capable of providing the lost media packet external to the UE itself. As an example, a server to which the UE is connected is an example of an external source, but the UE's local cache memory is not an external source because the local cache memory is part of the UE itself.

Based on the evaluation from 710, the UE determines whether to attempt recovery for the lost media packet, 715. If the UE determines not to attempt recovery for the lost media packet at 715, the process returns to 700 and the lost media packet is not recovered or played by the UE during the real-time communication session. Otherwise, if the UE determines to attempt recovery for the lost media packet at 715, the UE identifies at least one external source from the plurality of external sources for attempting recovery of the lost media packet based on the set of recovery criteria, 720. As will be appreciated from the examples provided below, the identification of the at least one external source for attempting recovery is a dynamic selection based on real-time considerations and is not a static selection where the UE simply asks a default external source to provide any missed packets.

Table 2 (below) shows an example of how the set of recovery criteria can be used to perform the determination of 715 and/or the identification of 720.

TABLE 2

Example Recovery Decision Logic and Recovery Source Identification

| | Urgency | External Source Info | Priority | Attempt Recovery? | Identified External Source(s) |
|---|---|---|---|---|---|
| #1 | High | Originating UE: [High Reliability, Slow Response Time] Application Server: [Intermediate Reliability, Intermediate Response Time] UE 3: [Low Reliability, Fast Response Time] UE 4: [Low Reliability, Low Response Time] | Default | Yes | UE 3 [Because Other External Sources are Too Slow] |
| #2 | High | Originating UE: [High Reliability, Slow Response Time] Application Server: [Intermediate Reliability, Intermediate Response Time] | Default | No [Because All External Sources are Too Slow] | N/A |
| #3 | Low | Originating UE: [High Reliability, Slow Response Time] Application Server: [Intermediate Reliability, Intermediate Response Time] UE 3: [Low Reliability, Fast Response Time] | Default | Yes | Originating UE [Because Urgency is Low, Most Reliable External Source is Selected] |
| #4 | Low | Originating UE: [High Reliability, Slow Response Time] Application Server: [Intermediate Reliability, Intermediate Response Time] UE 3: [Low Reliability, Fast Response Time] | Low | No [Not Worth Effort Due to Low Priority] | N/A |
| #5 | Intermediate | Originating UE: [High Reliability, Slow | High | Yes | Both Application |

TABLE 2-continued

Example Recovery Decision Logic and Recovery Source Identification

| Urgency | External Source Info | Priority | Attempt Recovery? | Identified External Source(s) |
|---|---|---|---|---|
| | Response Time] Application Server: [Intermediate Reliability, Intermediate Response Time] UE 3: [Low Reliability, Fast Response Time] | | | Server and UE 3 [Because of High Priority] |

Referring to Example #1 from Table 2 (above), assume that the UE performing the process of FIG. 7 corresponds to UE 2, that the originating UE of the lost media packet is UE 1, and that the real-time communication session is a group session that also includes UEs 3 and 4. Further assume that the urgency of the lost media packet is high (e.g., the UE is actively engaged in the session and will need to play the lost media packet soon). Because UE 1 is the originating source of the lost media packet and is assumed to be buffering its transmitted media packets, the reliability that UE 1 will be capable of providing the lost media packet is high, but UE 1 has a slow response time because UE 1 is accessed via the application server 170. The application server 170 may also be buffering the media for the session but has an intermediate reliability because media packets can be lost between UE 1 and the application server 170. The application server 170 thereby has both and an intermediate reliability and an intermediate response time. In Example #1 from Table 2, assume that UE 3 has a fast connection to UE 2 (e.g., UEs 2 and 3 are connected via LTE Direct, UEs 2 and 3 are connected via the same WLAN AP or Bluetooth connection and can exchange data directly without involving the application server 170, etc.). Thus, UE 3 has a low reliability but a fast response time. However, assume that UE 4 has a slow connection to UE 2 (e.g., UEs 2 and 4 are remove from each other or they can only be connected via the application server 170), such that UE 4 has a low reliability and a low response time. In Example #1 from Table 2, the priority of the lost media packet is assumed to be default. Under these assumptions for Example #1 from Table 2, the UE (i.e., UE 2) determines to attempt recovery for the lost media packet at 715 because there is at least one available external source that is expected to be capable of providing the lost media packet in time to satisfy its high urgency, and the UE identifies UE 3 as the external source from which to recover the lost media packet because the other available external sources are expected to be too slow at 720.

Referring to Example #2 from Table 2 (above), assume that the UE performing the process of FIG. 7 corresponds to UE 2, that the originating UE of the lost media packet is UE 1, and that the real-time communication session is a 1:1 or direct session. Further assume that the urgency of the lost media packet is high. In Example #2 from Table 2, similar to Example #1, the UE 1 has a high reliability and a slow response time, while the application server 170 has an intermediate reliability and an intermediate response time. In Example #2 from Table 2, the priority of the lost media packet is assumed to be default. Under these assumptions for Example #2 from Table 2, the UE (i.e., UE 2) determines not to attempt recovery for the lost media packet at 715 because there are no available external sources expected to be capable of providing the lost media packet in time to satisfy its high urgency.

Referring to Example #3 from Table 2 (above), assume that the UE performing the process of FIG. 7 corresponds to UE 2, that the originating UE of the lost media packet is UE 1, and that the real-time communication session is a group session that also includes UE 3. Further assume that the urgency of the lost media packet is low (e.g., an operator of UE 2 has temporarily paused the real-time communication session by answering another call, etc.). In Example #3 from Table 2, similar to Example #1, the UE 1 has a high reliability and a slow response time, the application server 170 has an intermediate reliability and an intermediate response time and UE 3 has a low reliability and a fast response time (e.g., under the assumption that UEs 2 and 3 have access to a fast back-channel connection such as LTE-Direct, WLAN or Bluetooth). In Example #3 from Table 2, the priority of the lost media packet is assumed to be default. Under these assumptions for Example #3 from Table 2, the UE (i.e., UE 2) determines to attempt recovery for the lost media packet at 715 because there is at least one available external source that is expected to be capable of providing the lost media packet in time to satisfy its high urgency, and the UE identifies UE 1 as the external source from which to recover the lost media packet despite UE 1's low response time because UE 1 has the highest reliability and the lost media packet is not particularly urgent.

Referring to Example #4 from Table 2 (above), assume that the UE performing the process of FIG. 7 corresponds to UE 2, that the originating UE of the lost media packet is UE 1, and that the real-time communication session is a group session that also includes UE 3. Further assume that the urgency of the lost media packet is low (e.g., an operator of UE 2 has temporarily paused the real-time communication session by answering another call, etc.). In Example #4 from Table 2, similar to Example #3, the UE 1 has a high reliability and a slow response time, the application server 170 has an intermediate reliability and an intermediate response time and UE 3 has a low reliability and a fast response time (e.g., under the assumption that UEs 2 and 3 have access to a fast back-channel connection such as LTE-Direct, WLAN or Bluetooth). In Example #4 from Table 2, the priority of the lost media packet is assumed to be low. Under these assumptions for Example #4 from Table 2, the UE (i.e., UE 2) determines not to attempt recovery for the lost media packet at 715 due to the low priority of the lost media packet. Thus, even though the lost media packet could probably be recovered from any of the available external sources, the low priority of the lost media packet is sufficient in this case to conserve battery resources on UE 2 and/or system resources by refraining from a lost packet recovery attempt.

Referring to Example #5 from Table 2 (above), assume that the UE performing the process of FIG. 7 corresponds to UE 2, that the originating UE of the lost media packet is UE 1, and that the real-time communication session is a group session that also includes UE 3. Further assume that the urgency of the lost media packet is intermediate (e.g., an operator of UE 2 has temporarily paused the real-time communication session but is expected to return to the real-time communication session relatively soon). In Example #5 from Table 2, similar to Example #4, the UE 1 has a high reliability and a slow response time, the application server 170 has an intermediate reliability and an intermediate response time and UE 3 has a low reliability and a fast response time (e.g., under the assumption that UEs 2 and 3 have access to a fast back-channel connection such as LTE-Direct, WLAN or Bluetooth). In Example #5 from Table 2, the priority of the lost media packet is assumed to be high. Under these assumptions for Example #5 from Table 2, the UE (i.e., UE 2) determines to attempt recovery for the lost media packet at 715 because there is at least one available external source that is expected to be capable of providing the lost media packet in time to satisfy its high urgency, and the UE identifies both the application server 170 and UE 3 as external sources from which to recover the lost media packet at 720. In this case, the high priority of the lost media packet is sufficient to prompt UE 2 to attempt lost packet recovery from multiple available external sources that are expected to be capable of providing the lost media packet in time.

Returning to FIG. 7, after identifying (i.e., dynamically selecting) the at least one external source from the set of external sources for attempting recovery of the lost media packet based on the set of recovery criteria at 720, the UE requests the lost media packet from the at least one identified external source, 725. If the requested copy (i.e., the replacement copy for the lost media packet) is received within an expiration deadline for playing the media frames from the lost media packet, the media frames from the requested copy are buffered and then played as if the lost media packet had not been lost in the first place, 730. On the other hand, if the requested copy arrives too late or does not arrive at all, the real-time communication sessions simply skips over the media frames for the lost media packet at 730.

While not illustrated explicitly in FIG. 7, the process of FIG. 7 can repeat for multiple lost media packets during the real-time communication session. Each time the process of FIG. 7 is executed, the set of recovery criteria is re-evaluated at 710 for each particular lost media packet. As will be appreciated, different external source(s) can be dynamically selected for recovery of the lost media packets at 720 based on these evaluations. Thus, the originating source (or UE) from which a first lost media packet may be selected for recovery of the first lost media packet, whereas the application server may be selected for recovery of a second lost media packet, whereas a local UE may be selected for recovery of a third lost media packet, and so on.

Figure 8:
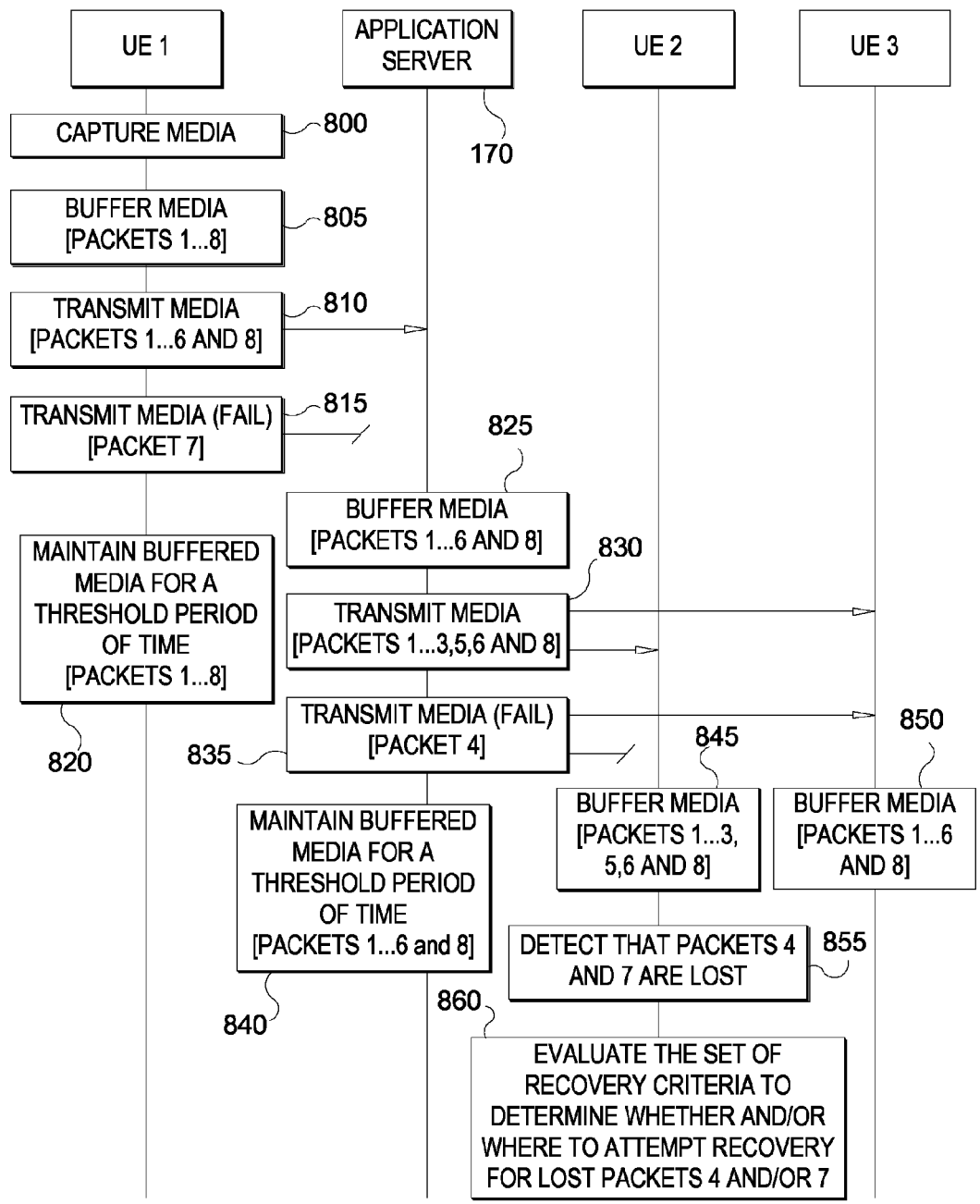
FIG. 8 illustrates a real-time communication session that is arbitrated by the application server whereby a transmitting UE is delivering media to a target UE in accordance with an embodiment of the invention.

FIG. 8 illustrates a real-time communication session that is arbitrated by the application server 170 whereby UE 1 is delivering media (e.g., audio media, video media, etc.) to UE 2 in accordance with an embodiment of the invention. In particular, the real-time communication session of FIG. 8 is executed in conjunction with the process described above with respect to FIG. 7. In the embodiment of FIG. 8, the real-time communication session can be half-duplex or full-duplex even though FIG. 8 focuses upon the flow of uni-directional media packets from UE 1 to UE 2. In an example, the real-time communication session in FIG. 8 can correspond to an RTP over UDP session, whereby media (e.g., audio media, video media, etc.) is contained within RTP packets that each includes at least one media frame.

Also, the real-time communication session in FIG. 8 can correspond to either a 1:1 or direct session or a group session. Thereby, UE 3 and its associated processes are shown via dotted lines to emphasize that these aspects are optional in the scenario where the real-time communication session is a 1:1 or direct session between UE 1 and UE 2.

Referring to FIG. 8, during the real-time communication session, UE 1 captures media, 800. The media capture that occurs at 800 can correspond to an audio recording device (e.g., a microphone) capturing audio data such as speech of an operator of UE 1, and/or to a video recording device (e.g., a camera) capturing video data of an environment of UE 1. UE 1 buffers the captured media within a set of media packets, 805. For convenience of explanation, assume that the captured media is buffered within media packets 1 . . . 8. In FIG. 8, assume that UE 1 successfully transmits media packets 1 . . . 6 and 8 to the application server 170, 810, but UE 1 does not successfully transmit media packet 7 to the application server 170, 815. For example, the transmission failure of 815 can be caused by physical later interference between UE 1 and its serving RAN, a backhaul loss between UE 1's serving RAN and the application server 170, and so on. After attempting to transmit media packets 1 . . . 8 at 815 and 815, instead of clearing the buffer from 805 as in 620 of FIG. 6, UE 1 maintains media packets 1 . . . 8 in its buffer for at least a threshold period of time, 820. In particular, media packets 1 . . . 8 can be maintained in UE 1's buffer for an extended period of time (e.g., 10 seconds, 15 seconds, etc.) in order to accommodate requests for any lost media packets from any target UE(s) participating in the real-time communication session.

Referring to FIG. 8, assume that the application server 170 receives and buffers media packets 1 . . . 6 and 8 from UE 1, 825, and that the application server 170 successfully transmits media packets 1, 2, 3, 5, 6 and 8 to UE 2 (and UE 3 for a group session scenario), 830, but that the application server 170 is unable to successfully transmit media packet 4 to UE 2, 835. For example, the transmission failure of 835 can be caused by physical layer interference between UE 2 and/or UE 3 and their respective serving RANs, a backhaul loss between the serving RANs of UEs 2 and 3 and the application server 170, and so on. Also, as will be recognized from 815, media packet 7 is not buffered at 825 or transmitted at 830 or 835 because media packet 7 never arrived at the application server 170. At 840, instead of clearing the buffer from 805, the application server 170 maintains media packets 1 . . . 6 and 8 in its buffer for at least a threshold period of time. In particular, media packets 1 . . . 6 and 8 can be maintained in the application server's 170 buffer for an extended period of time (e.g., 10 seconds, 15 seconds, etc.) in order to accommodate requests for any lost media packets from any target UE(s) participating in the real-time communication session.

UE 2 receives and buffers media packets 1, 2, 3, 5, 6 and 8, 845. For a group session scenario, UE 3 (optionally) receives and buffers media packets 1 . . . 6 and 8, 850, because the packet transmission failure for media packet 4 at 835 is assumed not to have affected UE 3 for the group session scenario. UE 2 also recognizes that media packets 4 and 7 were lost at some point during transfer, 855. Instead of simply ignoring lost media packets 4 and 7 as in conventional FIG. 6 or automatically requesting the lost media packets 4 and 7 from the serving RAN as in the conventional RLC session scenario, UE 2 evaluates the set of recovery criteria to determine whether and/or where to attempt recover for lost media packets 4 and/or 7, as in 710-720 of FIG. 7, 860. Below, a number of example continuations of FIG. 8 are described with respect to FIGS. 9A-10D that show alternative use cases based on the results of the evaluation from 860.

Figure 9A:
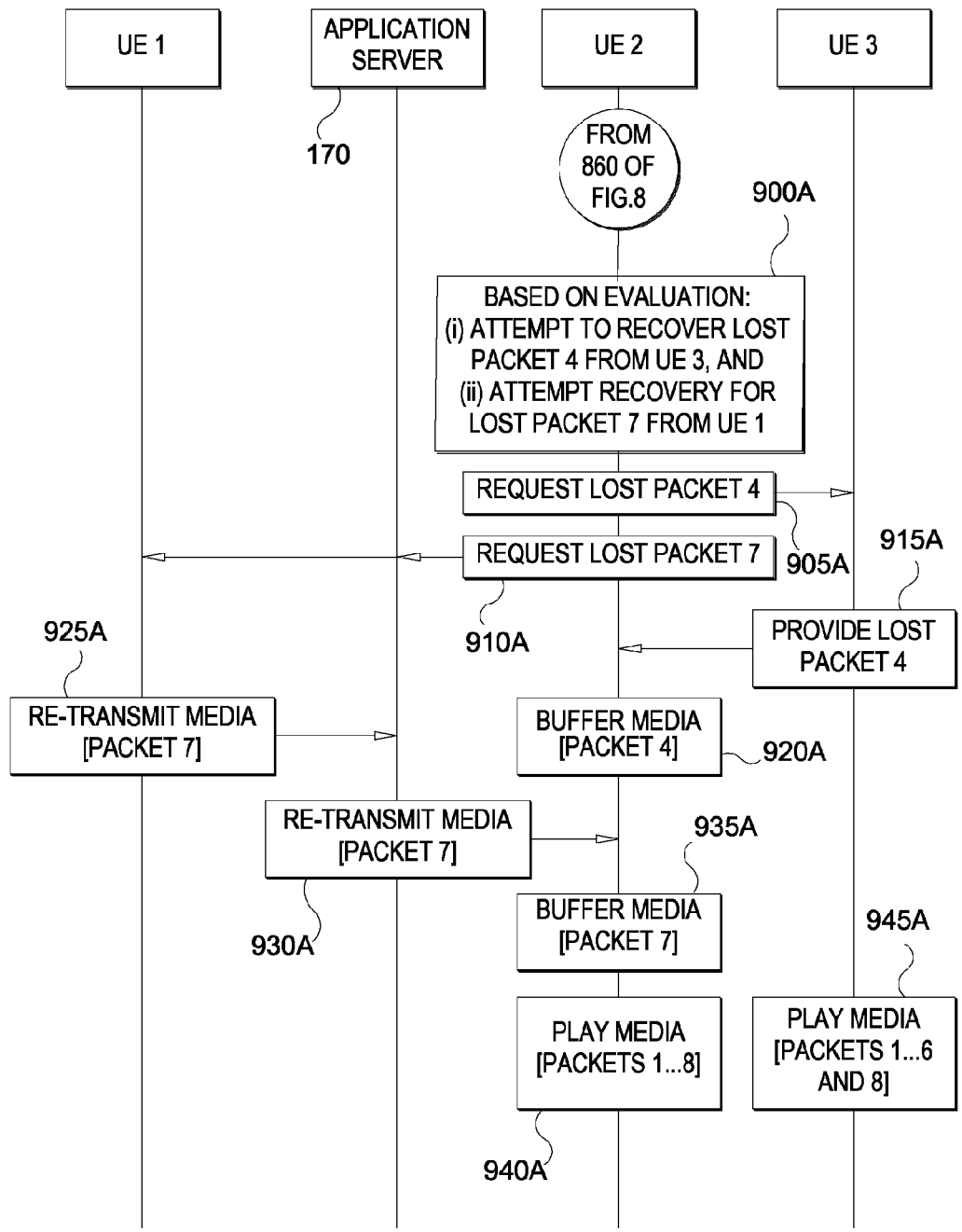
FIG. 9A illustrates a continuation of the process of FIG. 8 in accordance with an embodiment of the invention.

FIG. 9A illustrates a continuation of the process of FIG. 8 in accordance with an embodiment of the invention. In particular, FIG. 9A illustrates an example whereby the real-time communication session is a group session between UEs 1 ... 3. In the embodiment of FIG. 9A, at 900A, assume that UE 2 determines to attempt recovery for lost media packet 4 from UE 3 and to attempt recovery for lost media packet 7 from UE 1 based on the evaluation from 860 of FIG. 8. For example, UE 2's decisions at 900A can be based on lost media packet 4's earlier position in the packet sequence connoting a higher urgency for media packet 4 as compared with media packet 7 (e.g., as in Examples #1 and #3 from Table 2, respectively).

After identifying (or dynamically selecting) UE 3 and UE 1 at 900A as the external sources from which to attempt recovery for lost media packets 4 and 7, respectively, UE 2 transmits a request to UE 3 for lost media packet 4, 905A, and UE 2 also transmits a request to UE 1 for lost media packet 7 via the application server 170, 910A. In an example, the transmission of 905A can occur through a back-channel (e.g., LTE-Direct, WLAN or WiFi, Bluetooth, etc.) separate from a channel supported by UE 2's serving RAN for the real-time communication session, while the transmission of 910A occurs via UE 2's serving RAN. In response to the request for lost media packet 4, UE 3 provides a copy of media packet 4 at 915A, and UE 2 adds the replacement copy of media packet 4 into its buffer, 920A. In FIG. 9A, UE 3 is capable of providing media packet 4 because packet 4 was buffered by UE 3 at 850 and did not suffer the same transmission failure as UE 2. In response to the request for lost media packet 7, UE 1 retrieves media packet 7 from its buffer (e.g., based on the buffering from 820 of FIG. 8) and re-transmits a copy of media packet 7 at 925A to the application server 170, which re-transmits media packet 7 to UE 2, 930A, after which UE 2 adds the replacement copy of media packet 7 into its buffer, 935A. At 940A, UE 2 plays the media frames contained in each of media packets 1 ... 8 because UE 2 has at this point buffered each of media packets 1 ... 8, while UE 3 plays the media frames contained in media packets 1 ... 6 and 8 (but not media packet 7) because UE 3 did not recover media packet 7, 945A. Of course, in another embodiment, UE 3 can also execute the process of FIG. 7 whereby UE 3 could independently have recovered media packet 7 either from UE 1 or some other external source.

Figure 9B:
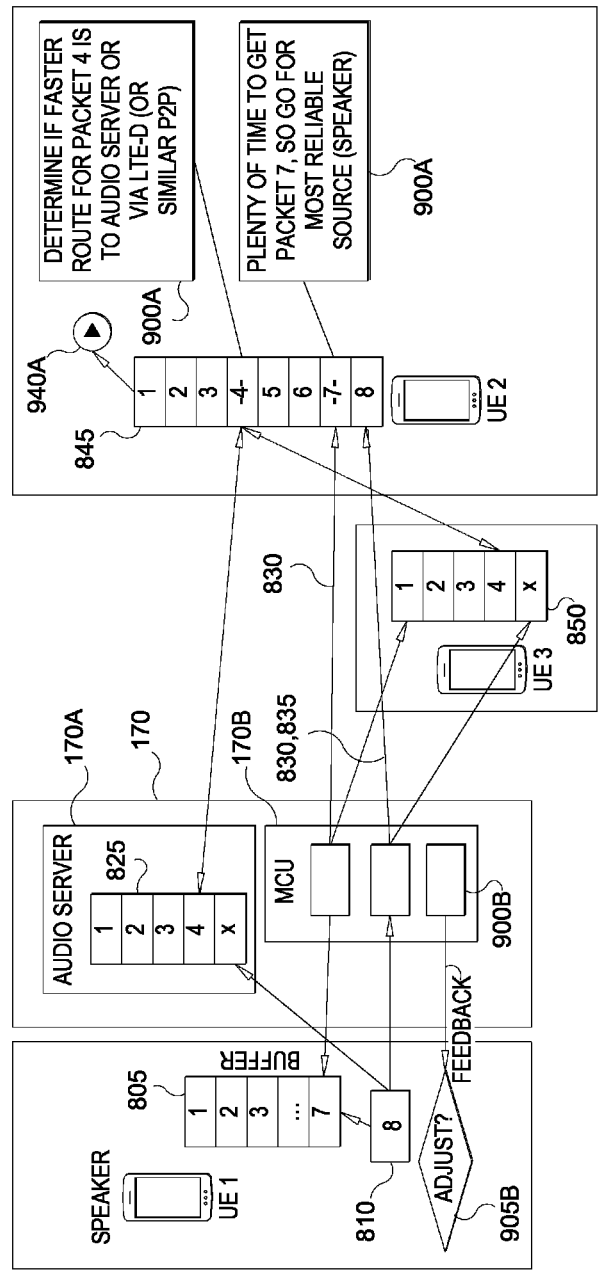
FIG. 9B illustrates a flow diagram showing portions of the processes of FIGS. 8 and 9A performed with respect to audio packets in accordance with an embodiment of the invention.

FIG. 9B illustrates a flow diagram showing portions of the processes of FIGS. 8 and 9A performed with respect to audio packets in accordance with an embodiment of the invention. Referring to FIG. 9B, the application server 170 includes an audio server component 170A and a multipoint control unit (MCU) 170B. As shown in FIG. 9B, UE 1 buffers audio packets 1 ... 8 at 805, and transmits the buffered audio packets at 810 to the audio server component 170A and the MCU 170B. The audio server component 170A buffers the audio packets that it receives, 825, and the MCU 170B transmits the audio packets to target UEs 2 and 3 as in 830-835, which are buffered by UEs 2 and 3 at 845-850. Based on the evaluation from 860 (not shown explicitly in FIG. 9B), UE 2 determines to recover audio packet 4 from UE 3 and to recover audio packet 4 from UE 1 at 900A. After recovering audio packets 4 and 7, UE 2 plays each of audio packets 1 ... 8 at 940A. Also shown in FIG. 9B is a separate closed feedback loop from the MCU 170B to UE 1, whereby the MCU 170B sends feedback, 900B, to UE 1 pertaining to user experience at UEs 2 and/or 3 (e.g., a packet error rate (PER), etc.). UE 1 or an operator thereof can use the feedback to adjust one or more call parameters at 905B.

Figure 10A:
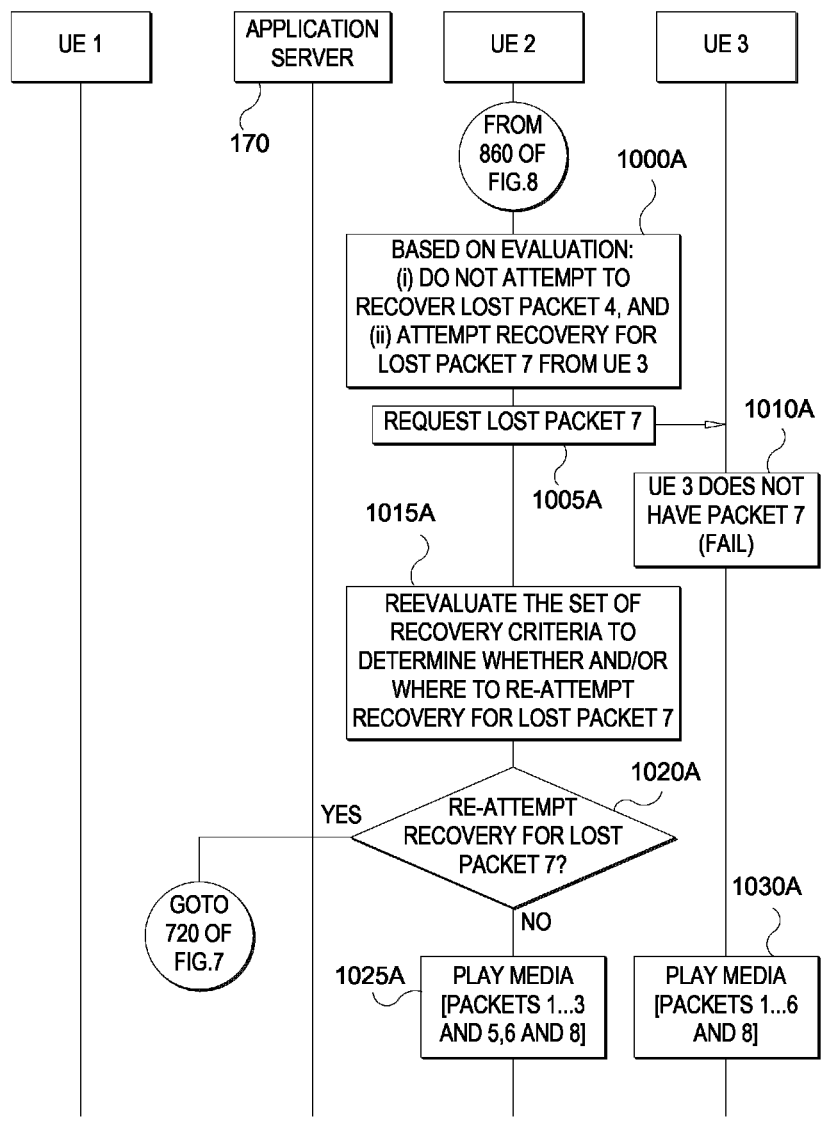
FIGS. 10A-10D illustrate continuations of the process of FIG. 8 in accordance with different embodiments of the invention.

FIG. 10A illustrates a continuation of the process of FIG. 8 in accordance with another embodiment of the invention. In particular, FIG. 10A illustrates an example whereby the real-time communication session is a group session between UEs 1 ... 3. In the embodiment of FIG. 10A, at 1000A, assume that UE 2 determines not to attempt recovery for lost media packet 4 and to attempt recovery for lost media packet 7 from UE 3 based on the evaluation from 860 of FIG. 8. For example, UE 2's decisions at 1000A can be based on lost media packet 4's earlier position in the packet sequence connoting a higher urgency for media packet 4 as compared with media packet 7, whereby the urgency for media packet 4 is too high to be satisfied by any of the available external sources while the urgency for media packet 7 can at least by satisfied by the expected response time for UE 3 (e.g., as in Examples #2 and #1 from Table 2, respectively).

After identifying (or dynamically selecting) UE 3 at 1000A as the external source from which to attempt recovery for lost media packet 7, UE 2 transmits a request to UE 3 for lost media packet 7, 1005A. In an example, the transmission of 1005A can occur through a back-channel (e.g., LTE-Direct, WLAN or WiFi, Bluetooth, etc.) separate from a channel supported by UE 2's serving RAN for the real-time communication session. In response to the request for lost media packet 7, UE 3 cannot provide a copy of media packet 7 because UE 3 also did not receive media packet 7, 1010A. Thereby, UE 2 is unable to recover lost media packet 7 from UE 3. However, because the connection between UEs 2 and 3 is relatively fast, UE 2 may recognize UE 3's inability to provide UE 2 with the copy of media packet 7 with sufficient time to attempt recovery of lost media packet 7 from some other external source (or sources). Accordingly, similar to 860 of FIG. 8, UE 2 reevaluates the set of recovery criteria to determine whether and/or where to re-attempt recovery for lost media packet 7, 1015A. As will be appreciated, UE 3 is specifically excluded from consideration as a potential source for recovery because UE 2 knows at 1015A that UE 3 does not have a copy of media packet 7. Based on the evaluation from 1015A, UE 2 determines whether to re-attempt recovery for lost media packet 7 from a different external source (or sources), 1020A. If UE 2 determines to re-attempt recovery for lost media packet 7 from a different external source (or sources) at 1020A, the process advances to 720 where these source(s) are identified (similar to 1000A but with different external source identification(s)). On the other hand, if UE 2 determines not to re-attempt recovery for lost media packet 7 (e.g., too much time has elapsed and none of the remaining available external sources, if any, are expected to be able to provide the copy of lost media packet 7 quickly enough at this point), UE 2 plays the media frames contained in each of media packets 1 ... 3, 5, 6 and 8, 1025A, because UE 2 has at this point buffered each of media packets 1 ... 3, 5, 6 and 8 (but not media packets 4 or 7), and UE 3 also plays the media frames contained in media packets 1 ... 6 and 8 (but not media packet 7), 1030A.

Figure 10B:
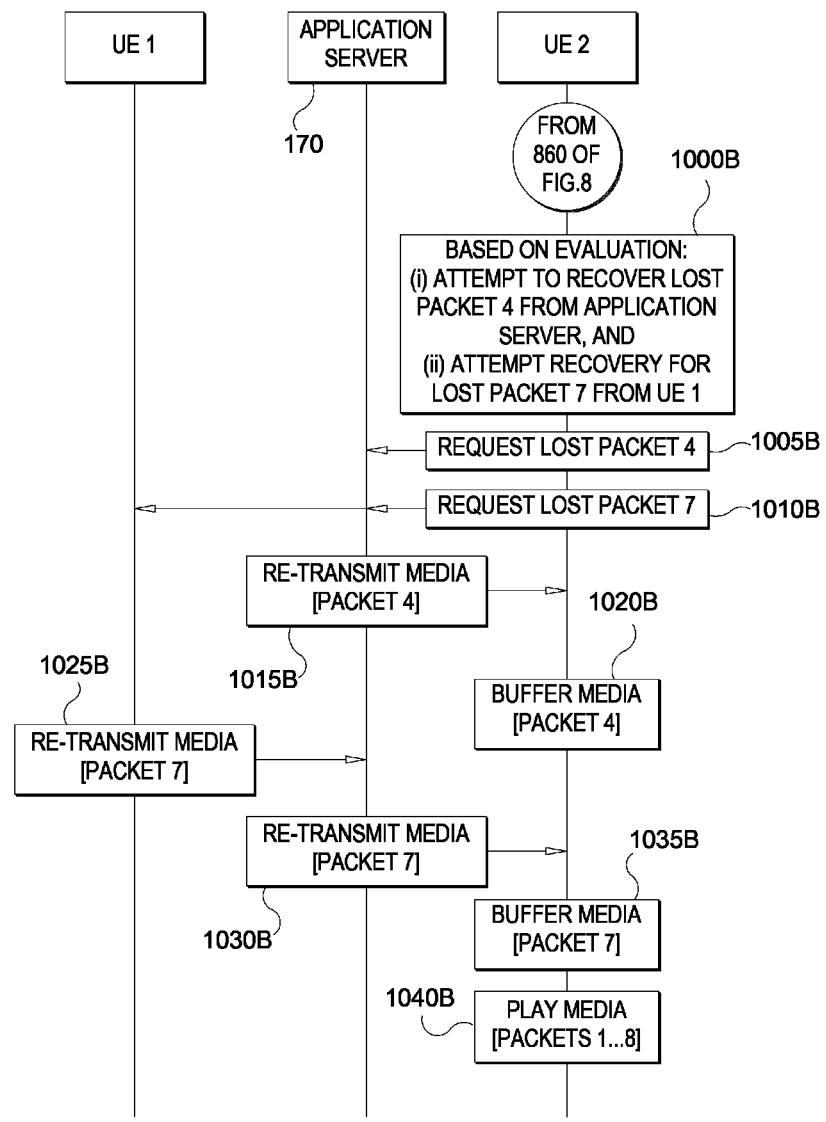

FIG. 10B illustrates a continuation of the process of FIG. 8 in accordance with another embodiment of the invention. In particular, FIG. 10B illustrates an example whereby the real-time communication session is a 1:1 or direct session between UE 1 and UE 2, so UE 3 is omitted from FIG. 10B altogether. In the embodiment of FIG. 10B, at 1000B, assume that UE 2 determines to attempt recovery for lost media packet 4 from the application server 170 and to attempt recovery for lost media packet 7 from UE 1 based on the evaluation from 860 of FIG. 8. For example, UE 2's decisions at 1000B can be based on lost media packet 4's earlier position in the packet sequence connoting a higher urgency for media packet 4 as compared with media packet 7, whereby the urgency for media packet 4 can be satisfied by the expected response time from the application server 170 but not UE 1, while the urgency for media packet 7 can be satisfied by either the expected response times from the application server 170 or UE 1, and UE 1 is selected for recovering media packet 7 based on UE 1's higher reliability (e.g., similar to Example #3 from Table 2).

After identifying (or dynamically selecting) the application server 170 as the external source from which to attempt recovery for lost media packet 4 and UE 1 as the external source from which to attempt recovery for lost media packet 7 at 1000B, UE 2 transmits a request to the application server 170 for lost media packet 4, 1005B, and the UE 2 transmits a request to UE 1 via the application server 170 for lost media packet 7, 1010B. In response to the request for lost media packet 4, the application server 170 re-transmits a copy of media packet 4 based on its buffering from 840, 1015B, and UE 2 adds the re-transmitted copy of packet 4 to the buffer, 1020B. In response to the request for lost media packet 7, UE 1 transmits a copy of media packet 7 to the application server 170 based on its buffering from 820, 1025B, the application server 170 in turn transmits the copy of media packet 7 to UE 2, 1030B, and UE 2 adds the transmitted copy of media packet 7 to the buffer, 1035B. Thereby, UE 2 is able to recover both lost media packets 4 and 7, and at 1040B, UE 2 plays the media frames contained in each of media packets 1 . . . 8 because UE 2 has at this point buffered each of media packets 1 . . . 8.

Figure 10C:
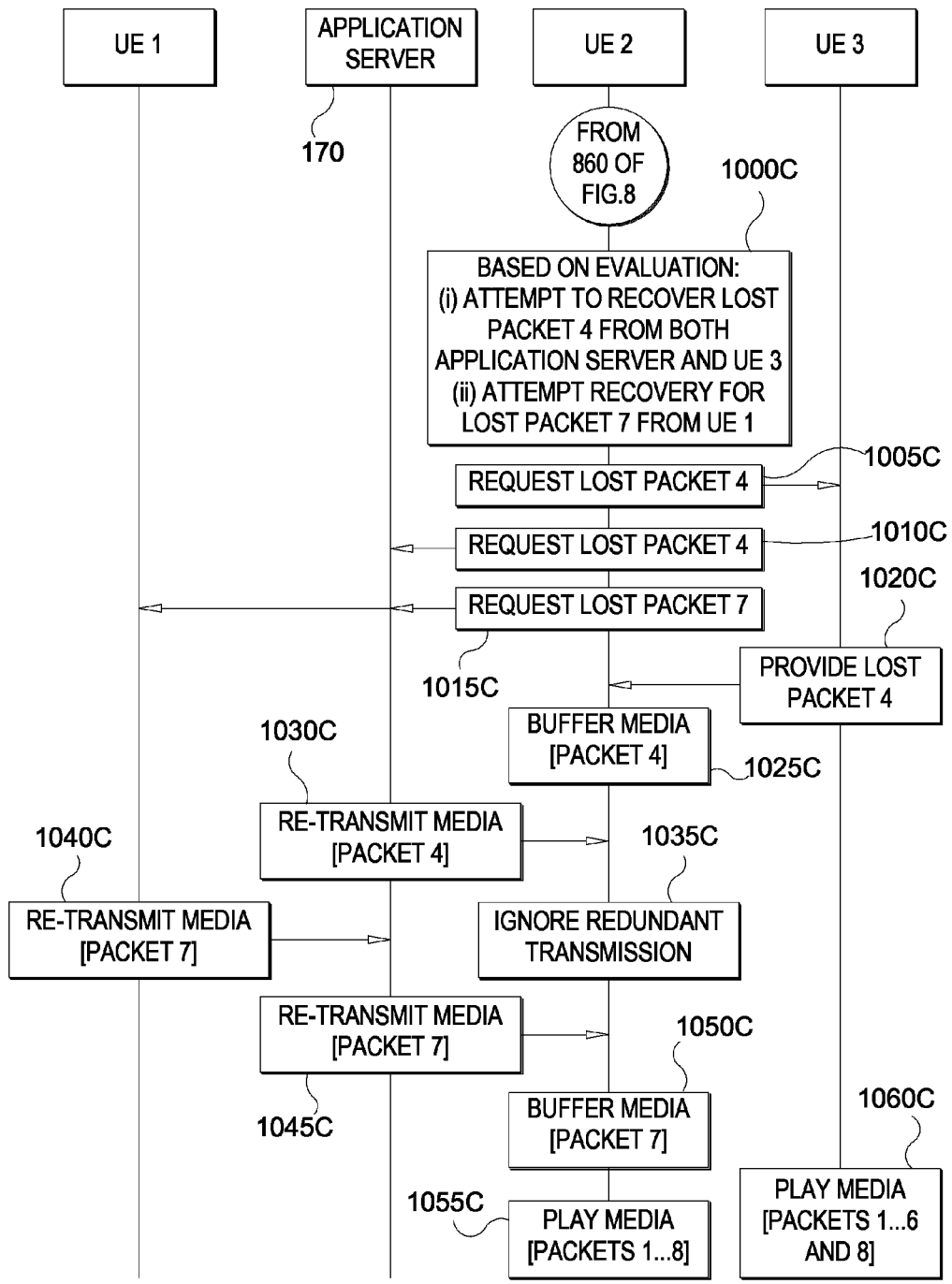

FIG. 10C illustrates a continuation of the process of FIG. 8 in accordance with another embodiment of the invention. In particular, FIG. 10C illustrates an example whereby the real-time communication session is a group session between UEs 1 . . . 3. In the embodiment of FIG. 10C, at 1000C, assume that UE 2 determines to attempt recovery from both the application server 170 and UE 3 for media packet 4 and to attempt recovery from UE 1 for media packet 7 based on the evaluation from 860 of FIG. 8. For example, UE 2's decisions at 1000C can be based on lost media packet 4 having a high priority and intermediate urgency, and media packet 7 having a relatively low urgency (e.g., as in Examples #5 and #3 from Table 2, respectively).

After identifying (or dynamically selecting) both the application server 170 and UE 3 at 1000C as the external sources from which to attempt recovery for lost media packet 4, UE 2 transmits a request to UE 3 for lost media packet 4, 1005C, and a request to the application server 170 for lost media packet 4, 1010C. In an example, the transmission of 1005C can occur through a back-channel (e.g., LTE-Direct, WLAN or WiFi, Bluetooth, etc.) separate from a channel supported by UE 2's serving RAN for the real-time communication session. Also, after identifying UE 1 at 1000C as the external source from which to attempt recovery for lost media packet 7, UE 2 transmits a request to UE 1 for lost media packet 7 via the application server 170, 1015C.

In response to the request for lost media packet 4 from 1005C, UE 3 provides a copy of media packet 4 based on the buffering from 850, 1020C, and UE 2 receives and buffers the copy of media packet 4, 1025C. In response to the request for lost media packet 4 from 1010C, the application server 170 also provides a copy of media packet 4 based on the buffering from 840, 1030C. In this case, UE 2 has already buffered media packet 4 at this point because UE 3 has a lower response time than the application server 170, so the transmission of 1030C is ignored (not buffered) by UE 2. As will be appreciated, in scenarios where UE 3 did not have the requested media packet buffered, the transmission of the media packet copy from the more reliable application server would be used instead of ignored as in 1035C. In response to the request for lost media packet 7 from 1015C, UE 1 transmits a copy of media packet 7 based on the buffering from 820, 1040C, the application server 170 transmits the copy of media packet 7 to UE 2, 1045C, and UE 2 receives and buffers the copy of media packet 7, 1050C. Thereby, UE 2 is able to recover lost media packets 4 and 7, and at 1055C, UE 2 plays the media frames contained in each of media packets 1 . . . 8 because UE 2 has at this point buffered each of media packets 1 . . . 8, and UE 3 plays the media frames contained in media packets 1 . . . 6 and 8 (but not media packet 7), 1060C.

Figure 10D:
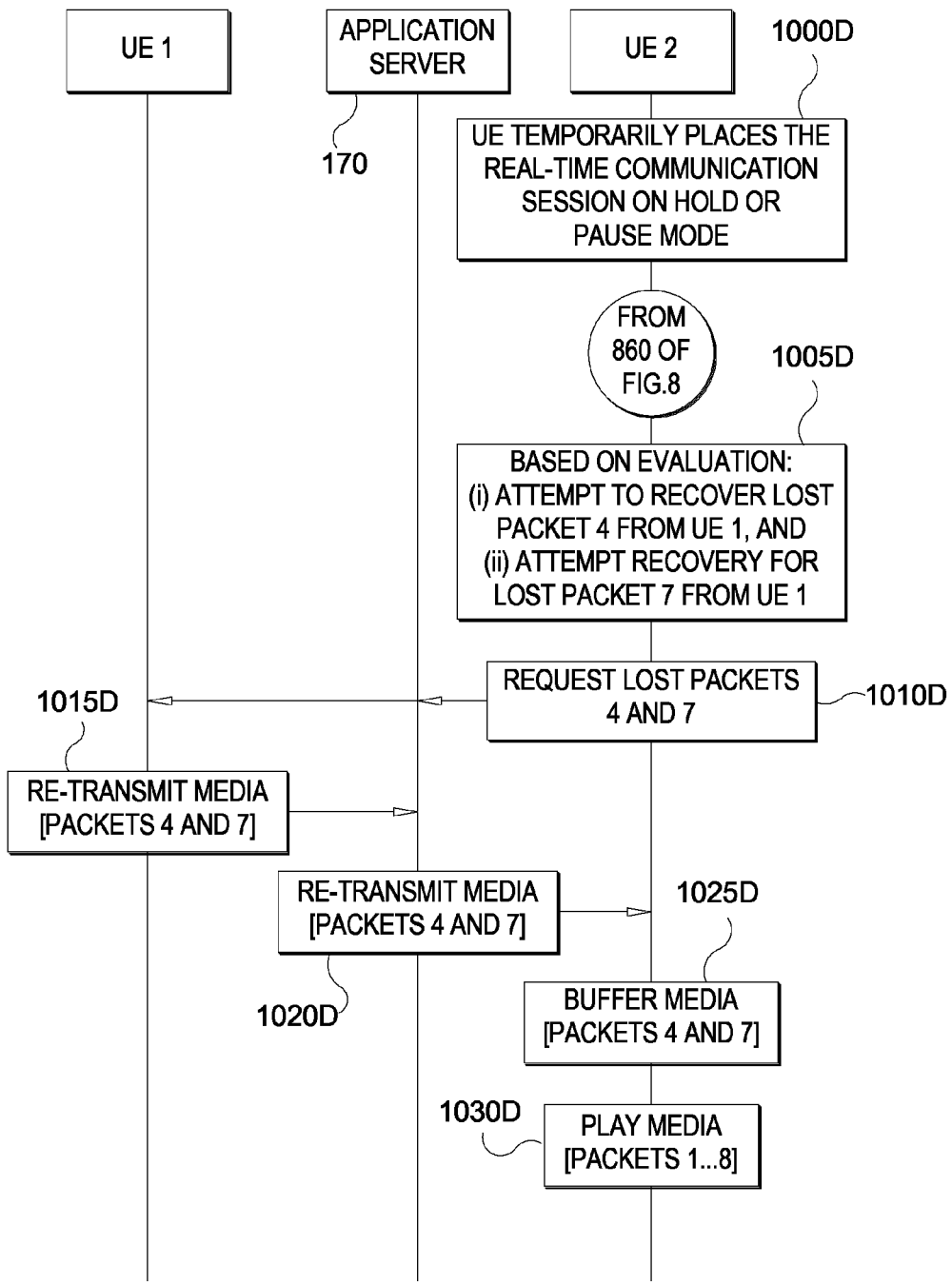

FIG. 10D illustrates a continuation of the process of FIG. 8 in accordance with another embodiment of the invention. In particular, FIG. 10D illustrates an example whereby the real-time communication session is a 1:1 or direct session between UE 1 and UE 2, so UE 3 is omitted from FIG. 10D altogether. In the embodiment of FIG. 10D, at some point before 860 of FIG. 8, assume that UE 2 temporarily places the real-time communication session on hold (e.g., in a paused state or paused mode), 1000D. This means that UE 2 is expected to return to the real-time communication session in a short period of time (e.g., 5 seconds, 10 seconds, etc.), but is not currently playing the media associated with the session. Thus, when 860 of FIG. 8 is performed, the urgency of any lost media packets (in this case, media packets 4 and 7) is set to a low urgency because UE 2 has some time in which to recover these media packets before they are played.

Accordingly, at 1005D, UE 2 determines to attempt recovery for lost media packets 4 and 7 from UE 1 based on the evaluation from 860 of FIG. 8. For example, UE 2's decisions at 1005D can be based on the urgency for media packets 4 and 7 being low and UE 1 having the highest reliability among the available external sources for these media packets (e.g., similar to Example #3 from Table 2).

After identifying (or dynamically selecting) the UE 1 as the external source from which to attempt recovery for lost media packets 4 and 7 at 1005D, UE 2 transmits a request to UE 1 via the application server 170 for lost media packets 4 and 7, 1010D. In response to the request for lost media packets 4 and 7, UE 1 transmits a copy of media packets 4 and 7 to the application server 170 based on its buffering from 820, 1015D, the application server 170 in turn transmits the copy of media packets 4 and 7 to UE 2, 1020D and UE 2 adds the transmitted copies of media packets 4 and 7 to the buffer, 1025D. Thereby, UE 2 is able to recover both lost media packets 4 and 7, and at 1030D, UE 2 "un-pauses" the session and plays the media frames contained in each of media packets 1 . . . 8 because UE 2 has at this point buffered each of media packets 1 . . . 8.

While the above-described embodiments of the invention have been described with respect to packet loss detection and lost packet recovery, it will be appreciated that other embodiments of the invention can be directed to frame loss detection and frame loss recovery. For example, an RTP packet can include multiple media frames, and it is possible that some of these frames are received correctly while others are not. In this case, the useable frames can be buffered while the logic described above with respect to FIG. 7 can be executed to determine whether to attempt recovery for any lost frames. Generally, the same logic described above for packets can be carried over to frames, as would be readily appreciated by one of ordinary skill in the art.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a user equipment (UE) configured to selectively recover lost media for a real-time communication session, comprising:
    detecting presence of a lost media packet from another UE participating in the real-time communication session that did not successfully arrive at the UE;
    evaluating, in response to the detecting, a set of recovery criteria associated with the lost media packet to dynamically select at least one external source from a plurality of external sources from which the lost media packet can potentially be recovered at different predicted reliabilities for recovery of the lost media packet based on the set of recovery criteria, wherein the different predicted reliabilities correspond to different levels of confidence that the plurality of external sources have access to a copy of the lost media packet; and
    requesting the lost media packet from the selected at least one external source based on the evaluation,
    wherein the requesting is performed by the UE without advance confirmation that the selected at least one external source has access to the copy of the lost media packet.

2. The method of claim 1, wherein the selected at least one external source includes multiple external sources.

3. The method of claim 2, wherein the requesting requests that each of the multiple external sources provide a given copy of the lost media packet.

4. The method of claim 3, further comprising:
    receiving a single copy of the lost media packet from one of the multiple external sources; and playing the received single copy of the lost media packet if the received single copy of the lost media packet is received before an expiration deadline of the lost media packet.

5. The method of claim 3, further comprising:
receiving two or more copies of the lost media packet from two or more of the multiple external sources;
selecting one of the two or more received copies of the lost media packet; and
playing the selected copy of the lost media packet if the selected copy of the lost media packet is received before an expiration deadline of the lost media packet.

6. The method of claim 5, wherein the selecting selects an earliest received copy as the selected copy.

7. The method of claim 1, wherein the selected at least one external source includes a single external source.

8. The method of claim 7, wherein the requesting requests that the single external source provide a copy of the lost media packet, further comprising:
receiving the requested copy of the lost media packet from the single external source; and
playing the received requested copy of the lost media packet if the received requested copy of the lost media packet is received before an expiration deadline of the lost media packet.

9. The method of claim 7,
wherein the single external source corresponds to a most reliable external source from among the plurality of external sources, or
wherein the evaluating is further based on response times of the plurality of external sources, with the single external source corresponding to a given external source associated with a fastest response time from among the plurality of external sources.

10. The method of claim 1, wherein the requesting fails to recover the lost media packet, further comprising:
determining not to re-request the lost media packet,
wherein the real-time communication session continues without playback of the lost media packet.

11. The method of claim 1, wherein the requesting fails to recover the lost media packet, further comprising:
determining to re-request the lost media packet;
re-evaluating the set of recovery criteria associated with the lost media packet to dynamically select at least one different external source from the plurality of external sources for requesting the lost media packet based on the set of recovery criteria; and
requesting the lost media packet from the selected at least one different external source based on the re-evaluating.

12. The method of claim 1, wherein the plurality of external sources from which the lost media packet can potentially be recovered includes the another UE, a server that is arbitrating the real-time communication session and/or one or more different UEs that are also participating in the real-time communication session.

13. The method of claim 1, further comprising:
pausing the real-time communication session in response to the detection;
receiving a given copy of the lost media packet from the selected at least one external source; and
un-pausing the real-time communication session and playing the received copy of the lost media packet.

14. The method of claim 13, wherein the selected at least one external source includes a given external source associated with a highest reliability from the plurality of external sources.

15. The method of claim 1, wherein the set of recovery criteria includes:
(i) a playback urgency of the lost media packet,
(ii) a reliability of each of the plurality of external sources from which the lost media packet can potentially be recovered,
(iii) an expected response time of each of the plurality of external sources, and/or
(iv) a priority of the lost media packet.

16. The method of claim 15, wherein the set of recovery criteria includes at least (i) and (iii).

17. The method of claim 16,
wherein the playback urgency of the lost media packet is characterized as low if the real-time communication session is paused and the UE is actively engaged in another real-time communication session, as intermediate if the real-time communication session is paused while the UE is not actively engaged in another real-time communication session, or as high if the UE is actively engaged in the real-time communication session,
wherein the playback urgency of the lost media packet is high, and
wherein the evaluating dynamically selects the selected at least one external source as a subset of the plurality of external sources with expected response times that satisfy the high playback urgency.

18. The method of claim 17, wherein the subset includes at least:
a different UE that is also participating in the real-time communication session and is connected to the UE via a supplemental communication link that bypasses a server that is arbitrating the real-time communication session.

19. The method of claim 15, wherein the set of recovery criteria includes at least (i), (ii) and (iii).

20. The method of claim 19,
wherein the playback urgency of the lost media packet is characterized as low if the real-time communication session is paused and the UE is actively engaged in another real-time communication session, as intermediate if the real-time communication session is paused while the UE is not actively engaged in another real-time communication session, or as high if the UE is actively engaged in the real-time communication session,
wherein the playback urgency of the lost media packet is intermediate, and
wherein the evaluating dynamically selects the selected at least one external source as inclusive of at least a most reliable external source with a given expected response time that satisfies the intermediate playback urgency.

21. The method of claim 20, wherein the most reliable external source with the given expected response time that satisfies the intermediate playback urgency is a server that is arbitrating the real-time communication session.

22. The method of claim 19,
wherein the playback urgency of the lost media packet is characterized as low if the real-time communication session is paused and the UE is actively engaged in another real-time communication session, as intermediate if the real-time communication session is paused while the UE is not actively engaged in another real-time communication session, or as high if the UE is actively engaged in the real-time communication session, wherein the playback urgency of the lost media packet is low, and
wherein the evaluating dynamically selects the selected at least one external source as inclusive of at least a most reliable external source with a given expected response time that satisfies the low playback urgency.

23. The method of claim 22, wherein the most reliable external source with the given expected response time that satisfies the low playback urgency is the another UE.

24. The method of claim 15, wherein the set of recovery criteria includes at least (iv).

25. The method of claim 24,
wherein the requesting is performed based on the priority of the lost media packet being above a threshold, and
wherein one or more requests to recover one or more other lost media packets during the real-time communication session are skipped based on priorities of the one or more other lost media packets being below the threshold.

26. The method of claim 1, wherein the requesting requests the lost media packet without exiting a real-time communication phase of the real-time communication session.

27. The method of claim 1, further comprising:
detecting presence of another lost media packet from the another UE participating in the real-time communication session that did not successfully arrive at the UE;
evaluating the set of recovery criteria associated with the another lost media packet to dynamically select one or more external sources from the plurality of external sources from which the another lost media packet can potentially be recovered at the different predicted reliabilities based on the set of recovery criteria; and
requesting the another lost media packet from the selected one or more external sources based on the evaluation of the set of recovery criteria associated with the another lost media packet,
wherein the selected at least one external source selected for recovery of the lost media packet differs from the selected one or more external sources selected for recovery of the another lost media packet.

28. A user equipment (UE) configured to selectively recover lost media for a real-time communication session, comprising:
means for detecting presence of a lost media packet from another UE participating in the real-time communication session that did not successfully arrive at the UE;
means for evaluating, in response to the detection, a set of recovery criteria associated with the lost media packet to dynamically select at least one external source from a plurality of external sources from which the lost media packet can potentially be recovered at different predicted reliabilities for recovery of the lost media packet based on the set of recovery criteria, wherein the different predicted reliabilities correspond to different levels of confidence that the plurality of external sources have access to a copy of the lost media packet; and
means for requesting the lost media packet from the selected at least one external source based on the evaluation,
wherein the means for requesting requests the lost media packet from the selected at least one external source without advance confirmation that the selected at least one external source has access to the copy of the lost media packet.

29. A user equipment (UE) configured to selectively recover lost media for a real-time communication session, comprising:
a processor, a memory and a transceiver configured to:
detect presence of a lost media packet from another UE participating in the real-time communication session that did not successfully arrive at the UE;
evaluate, in response to the detection, a set of recovery criteria associated with the lost media packet to dynamically select at least one external source from a plurality of external sources from which the lost media packet can potentially be recovered at different predicted reliabilities for recovery of the lost media packet based on the set of recovery criteria, wherein the different predicted reliabilities correspond to different levels of confidence that the plurality of external sources have access to a copy of the lost media packet; and
request the lost media packet from the selected at least one external source based on the evaluation,
wherein the processor, the memory and the transceiver are configured to request the lost media packet from the selected at least one external source without advance confirmation that the selected at least one external source has access to the copy of the lost media packet.

30. A non-transitory computer-readable medium containing instructions stored thereon, which, when executed by a user equipment (UE) configured to selectively recover lost media for a real-time communication session, cause the UE to perform operations, the instructions comprising:
at least one instruction to cause the UE to detect presence of a lost media packet from another UE participating in the real-time communication session that did not successfully arrive at the UE;
at least one instruction to cause the UE to evaluate, in response to the detection, a set of recovery criteria associated with the lost media packet to dynamically select at least one external source from a plurality of external sources from which the lost media packet can potentially be recovered at different predicted reliabilities for recovery of the lost media packet based on the set of recovery criteria, wherein the different predicted reliabilities correspond to different levels of confidence that the plurality of external sources have access to a copy of the lost media packet; and
at least one instruction to cause the UE to request the lost media packet from the selected at least one external source based on the evaluation,
wherein the at least one instruction to cause the UE to request causes the UE to request the lost media packet from the selected at least one external source without advance confirmation that the selected at least one external source has access to the copy of the lost media packet.

* * * * *